US009838556B2

(12) United States Patent
Fujioka

(10) Patent No.: US 9,838,556 B2
(45) Date of Patent: Dec. 5, 2017

(54) IMAGE PROCESSING APPARATUS, METHOD FOR CONTROLLING IMAGE PROCESSING APPARATUS, ELECTRONIC APPARATUS, AND NON-TRANSITORY RECORDING MEDIUM

(71) Applicant: Takuroh Fujioka, Kanagawa (JP)

(72) Inventor: Takuroh Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/357,263

(22) Filed: Nov. 21, 2016

(65) Prior Publication Data
US 2017/0163829 A1  Jun. 8, 2017

(30) Foreign Application Priority Data

Dec. 3, 2015 (JP) ................................. 2015-236689
May 9, 2016 (JP) ................................. 2016-094045

(51) Int. Cl.
*G06K 15/00* (2006.01)
*H04N 1/00* (2006.01)
(Continued)

(52) U.S. Cl.
CPC ..... *H04N 1/00891* (2013.01); *H04N 1/00251* (2013.01); *H04N 1/00307* (2013.01); *H04N 1/00411* (2013.01); *H04N 1/32101* (2013.01); *H04N 1/32765* (2013.01); *H04N 1/32786* (2013.01); *H04N 1/442* (2013.01); *H04N 1/4406* (2013.01); *H04N 2201/0055* (2013.01);
(Continued)

(58) Field of Classification Search
None
See application file for complete search history.

(56) References Cited

U.S. PATENT DOCUMENTS

2013/0205156 A1* 8/2013 Niitsuma .............. G06F 1/3287
713/324
2013/0329253 A1 12/2013 Sasaki
(Continued)

FOREIGN PATENT DOCUMENTS

JP  2009-296474  12/2009
JP  2012-104035  5/2012
(Continued)

*Primary Examiner* — Dov Popovici
(74) *Attorney, Agent, or Firm* — Harness, Dickey & Pierce, P.L.C.

(57) ABSTRACT

An image processing apparatus includes circuitry to authenticate a first user, a display to display an initial screen to the first user, after the first user is authenticated, and a communication device to wirelessly communicate with a portable terminal device operated by the first user to control a display of the portable terminal device to display an additional initial screen based on display contents of the initial screen. The circuitry further determines whether at least one of the image processing apparatus and the portable terminal device is not in use. Based on a determination indicating that the at least one of the image processing apparatus and the portable terminal device is not in use, the circuitry determines whether any user is present at the image processing apparatus, using a detector that detects human presence at the image processing apparatus to generate a first determination result.

12 Claims, 31 Drawing Sheets

(51) Int. Cl.
  *H04N 1/44*  (2006.01)
  *H04N 1/32*  (2006.01)
  *H04N 1/327* (2006.01)
  *G06F 3/12*  (2006.01)

(52) U.S. Cl.
  CPC ............... *H04N 2201/0094* (2013.01); *H04N 2201/3205* (2013.01)

(56) References Cited

U.S. PATENT DOCUMENTS

| | | | | |
|---|---|---|---|---|
| 2014/0002838 A1* | 1/2014 | Imine | ................ | H04N 1/00228 358/1.13 |
| 2015/0234474 A1* | 8/2015 | Yokoyama | ............ | G06F 1/3287 713/323 |
| 2016/0094747 A1* | 3/2016 | Horie | ................ | H04N 1/00891 358/1.13 |
| 2017/0155800 A1* | 6/2017 | Nagasawa | ............... | G06F 21/32 |

FOREIGN PATENT DOCUMENTS

| | | |
|---|---|---|
| JP | 2013-256060 | 12/2013 |
| JP | 2015-130565 | 7/2015 |

\* cited by examiner

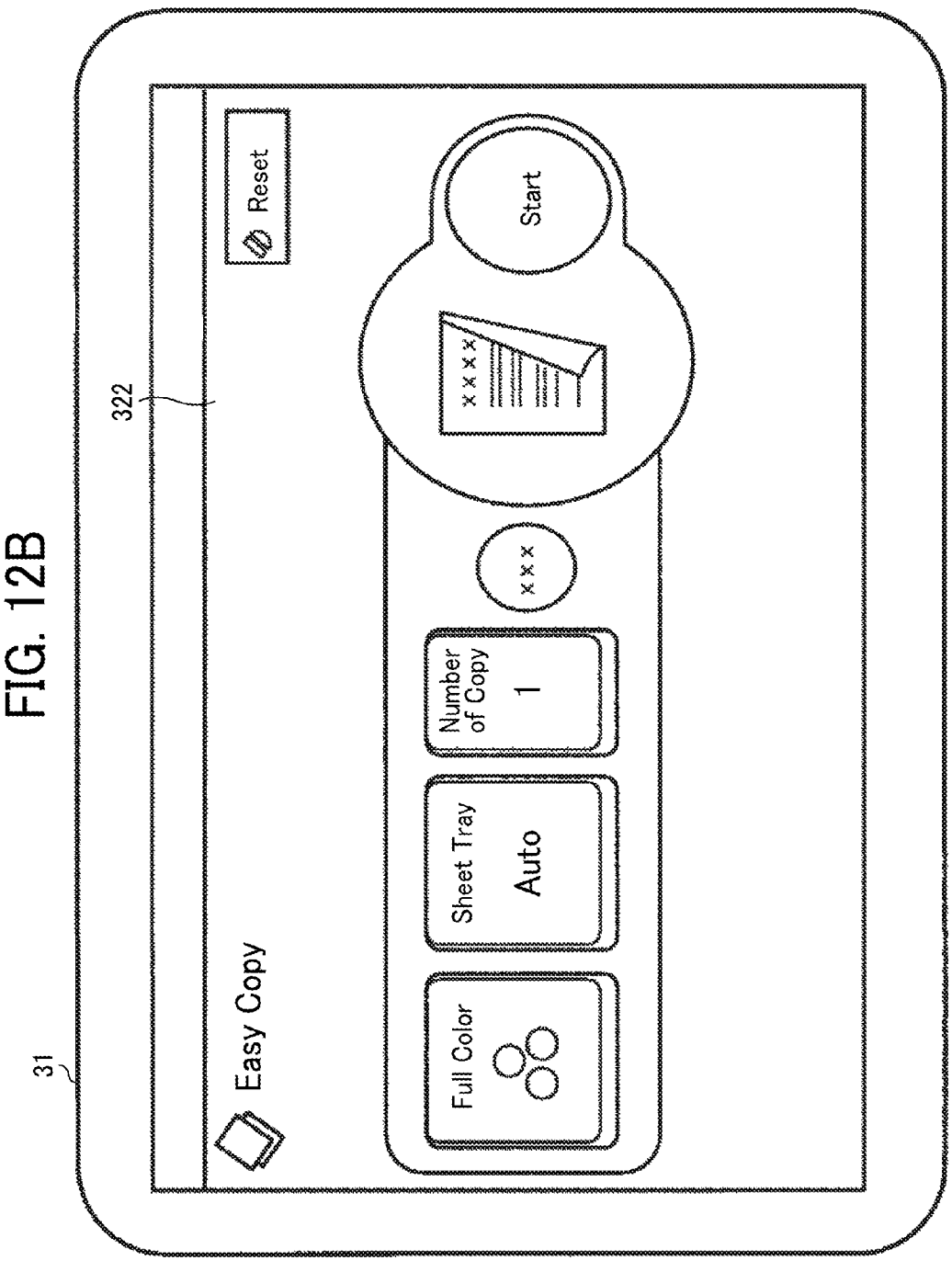

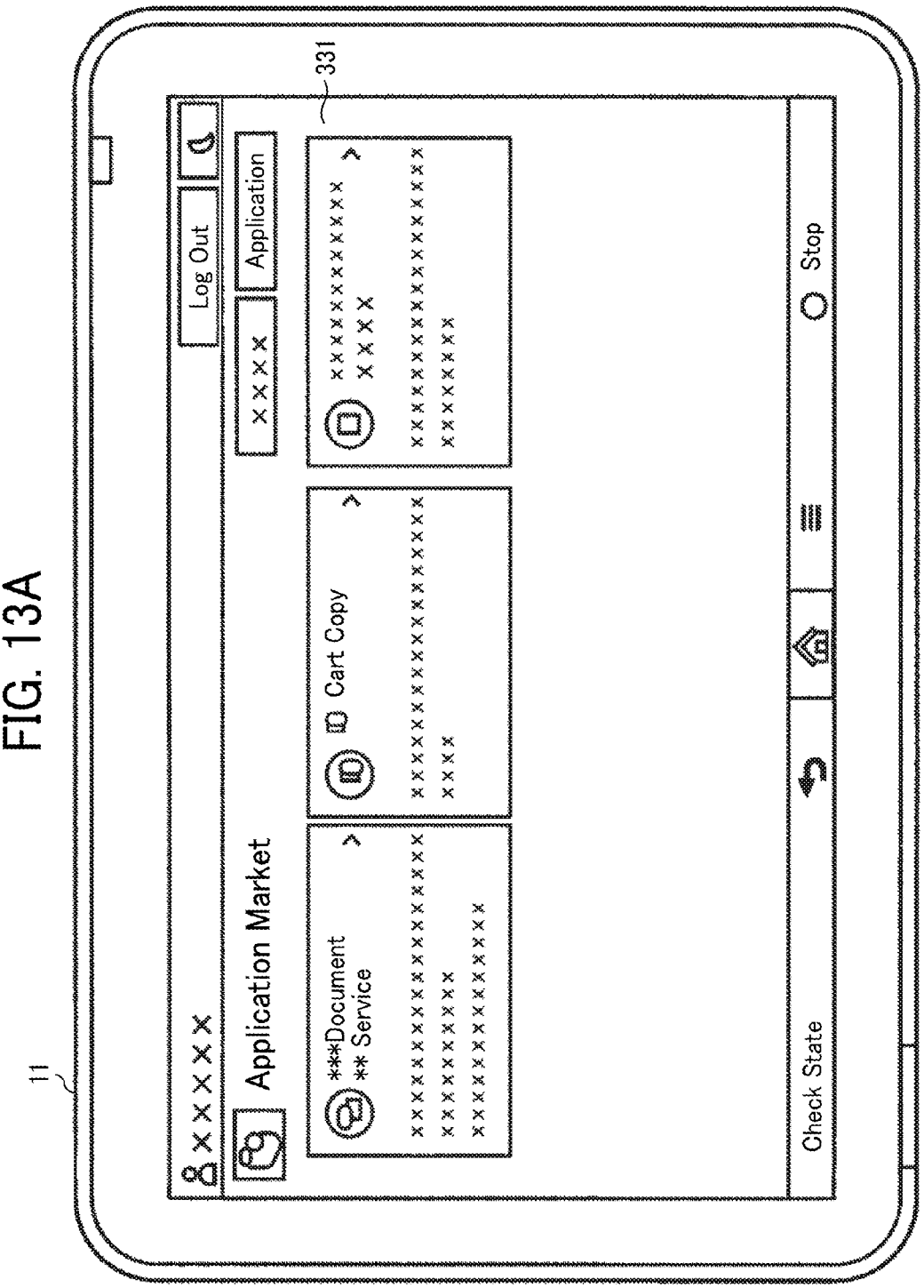

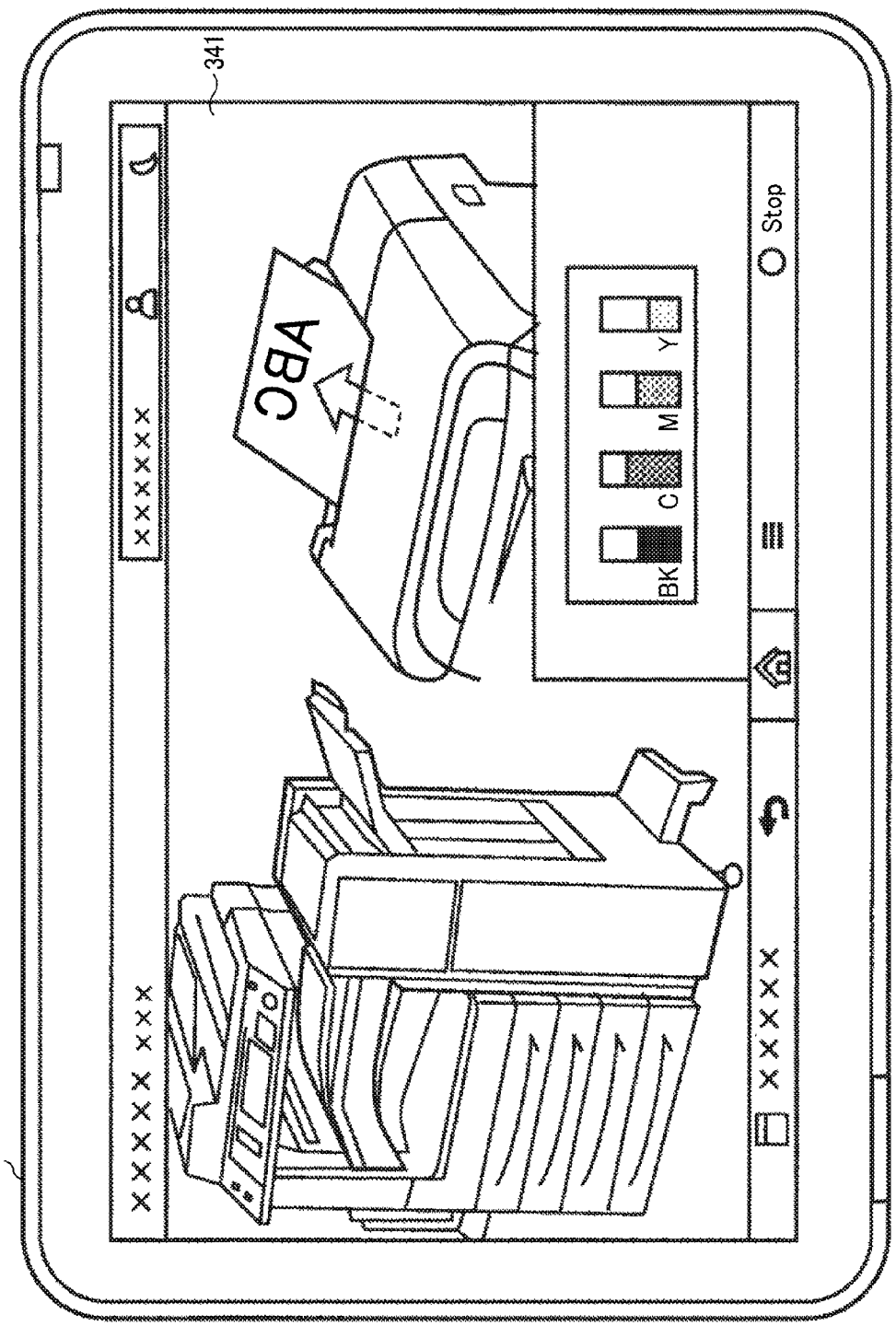

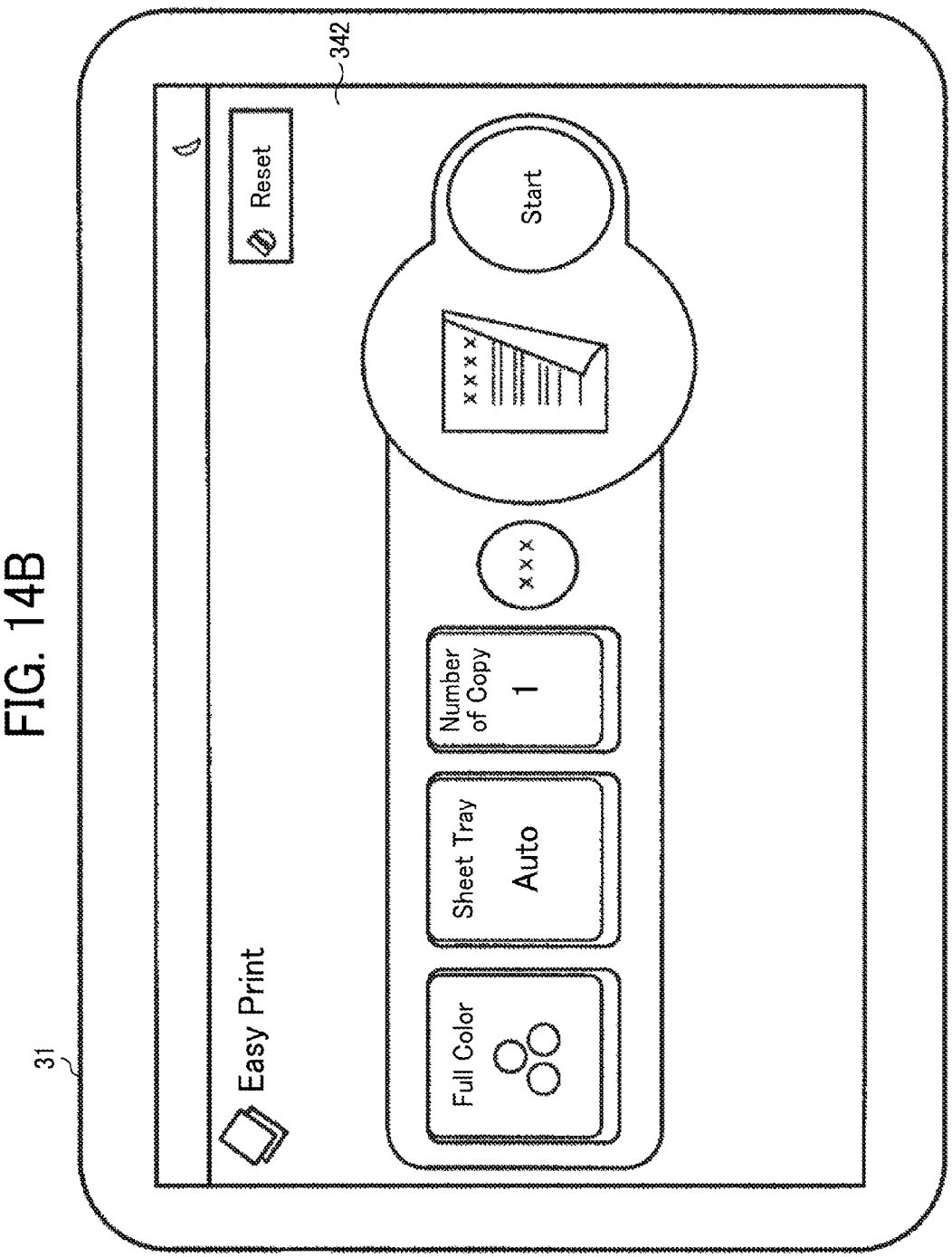

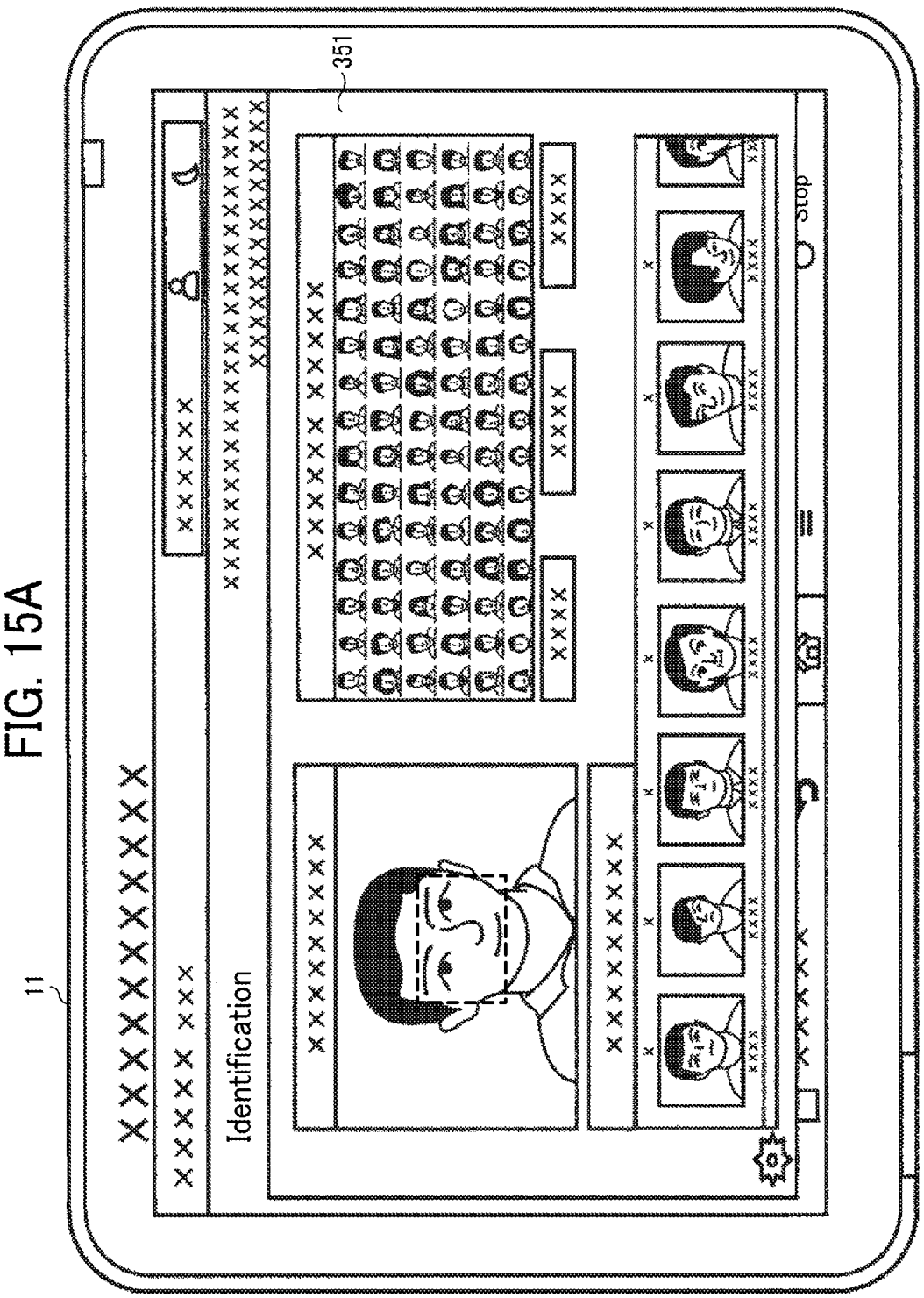

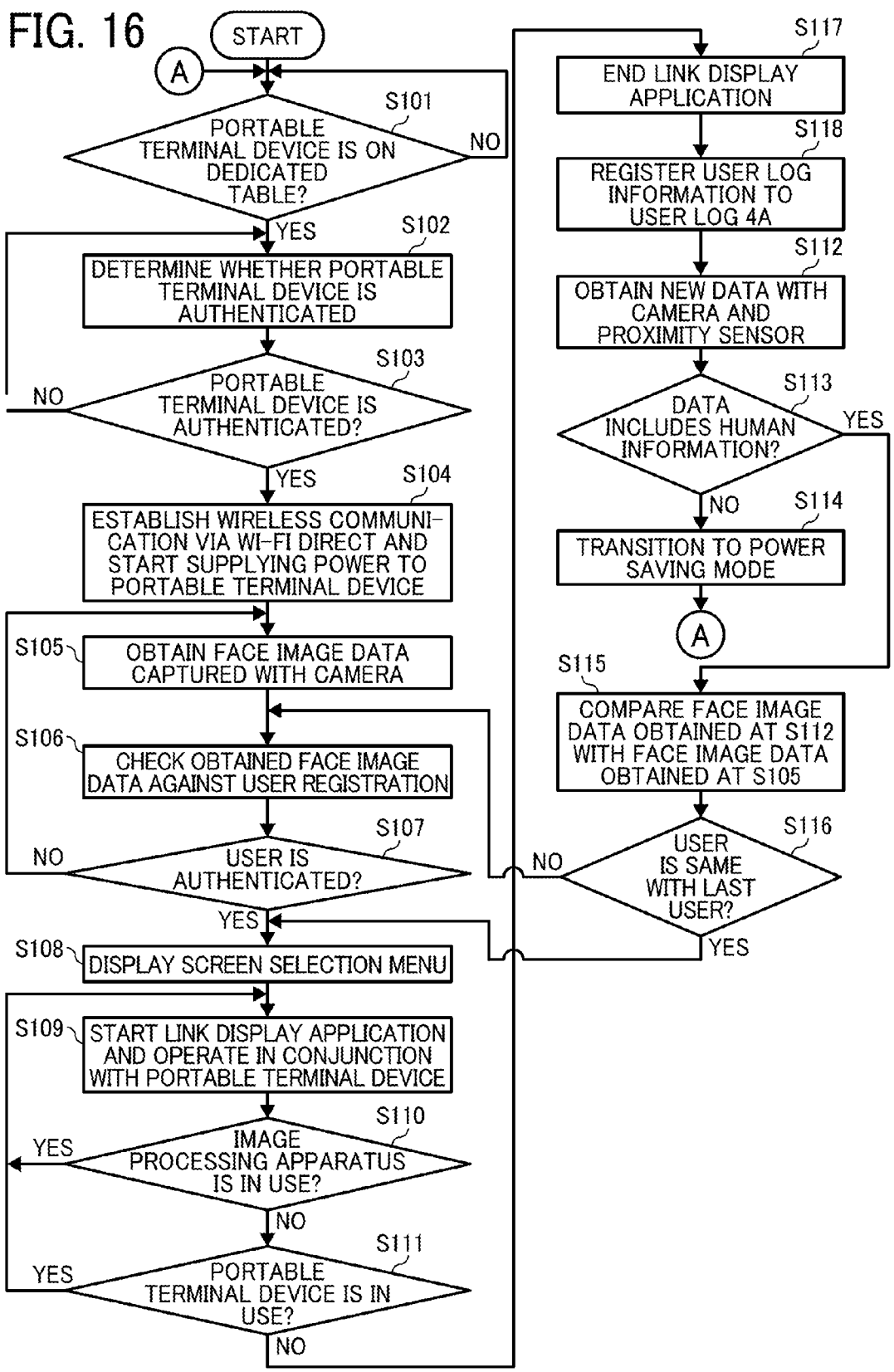

FIG. 17A
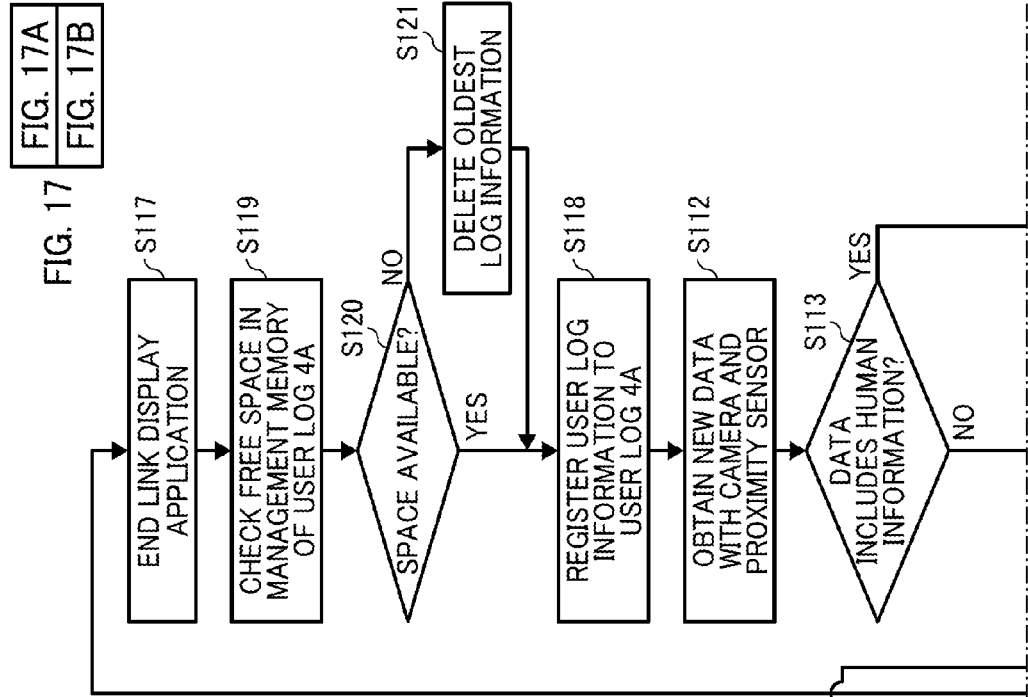
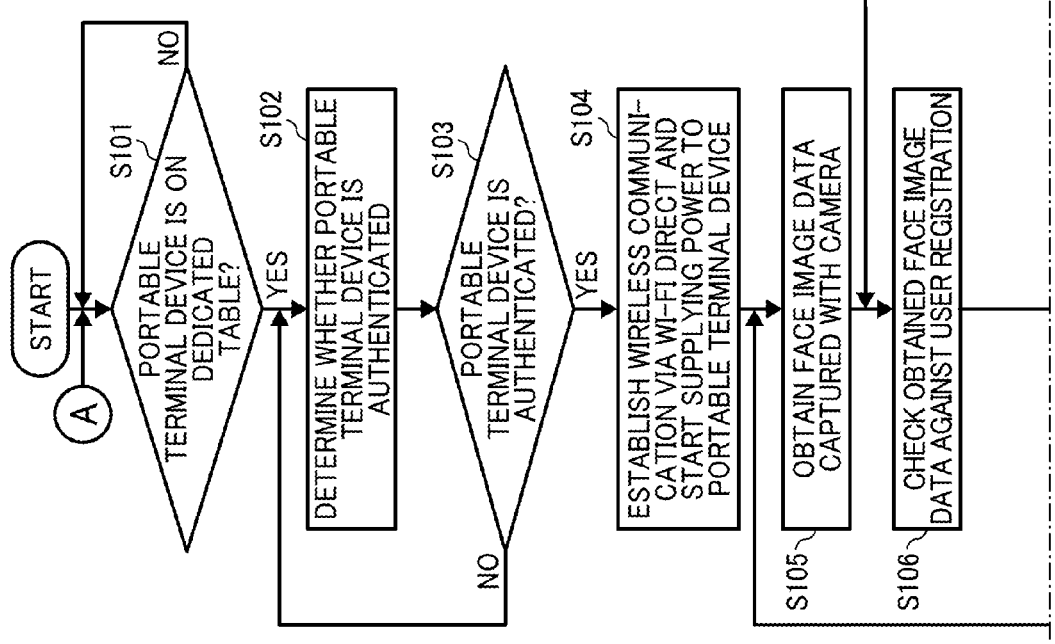

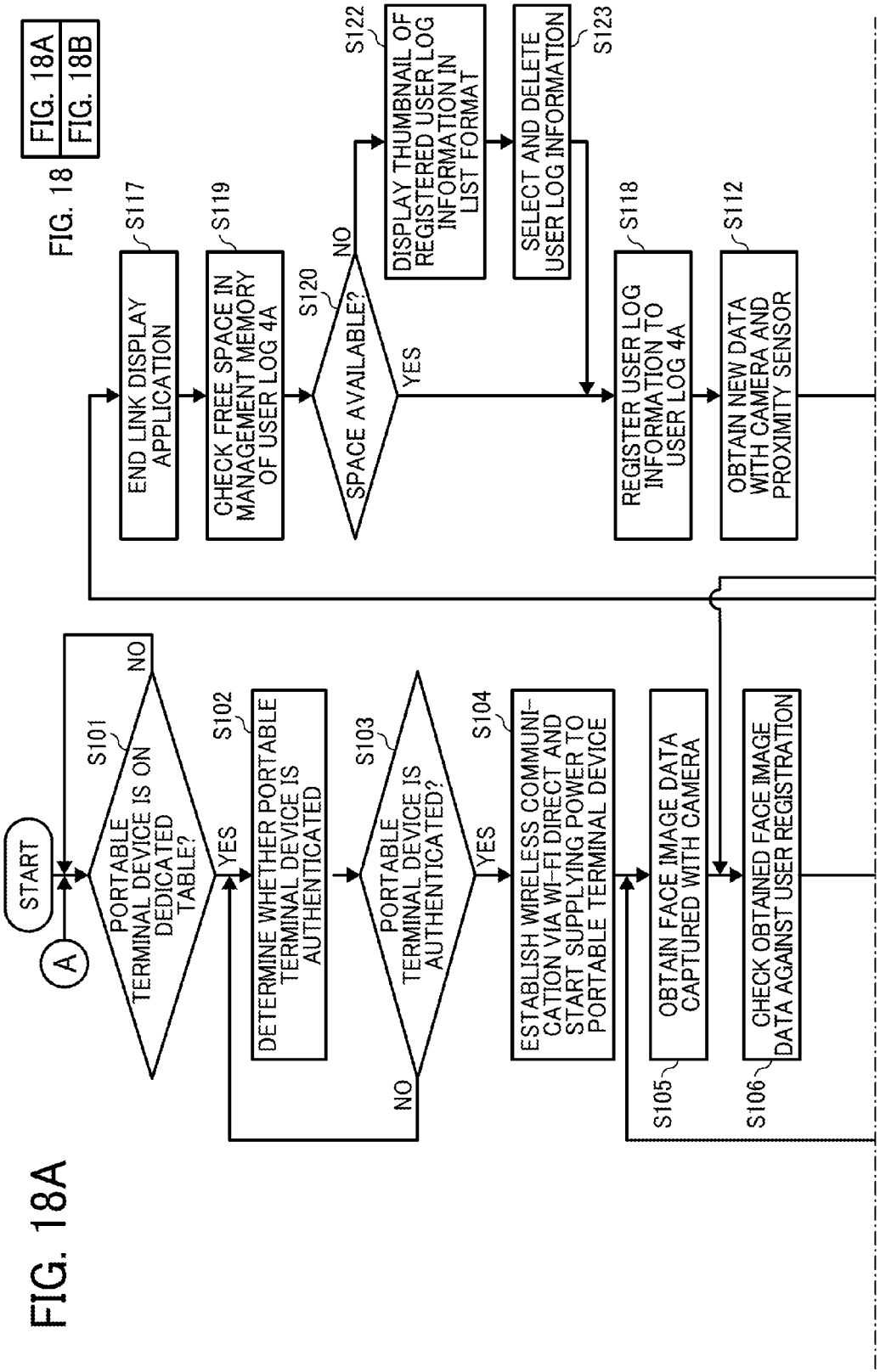

FIG. 19A

| User ID | Log In Time | Panel ID | Application | Duration |
|---|---|---|---|---|
| FAAG01 | 2016/01/16 14:58:58 | Gergugu268 | Karachi | 00:02:26 |
| QTAR02 | 2016/01/16 14:49:36 | Gergugu268 | Karachi | 00:01:48 |
| ABBZ24 | 2016/01/16 14:05:14 | Gergugu268 | Isip | 00:03:44 |
| ABBZ24 | 2016/01/16 13:26:18 | Gergugu268 | Job Magic | 00:08:49 |
| CAKP36 | 2016/01/16 13:07:38 | Soliton225 | kofax | 00:04:30 |
| CAKP36 | 2016/01/16 11:58:56 | Soliton225 | Equitrac Office | 00:11:36 |
| CAKP36 | 2016/01/16 ...45:22 | Soliton225 | Chameleon | 00:09:02 |
| GERQ08 | 2016/01/... | Soliton225 | ICE | 00:02:59 |
| ... | ... | ... | ... | ... |

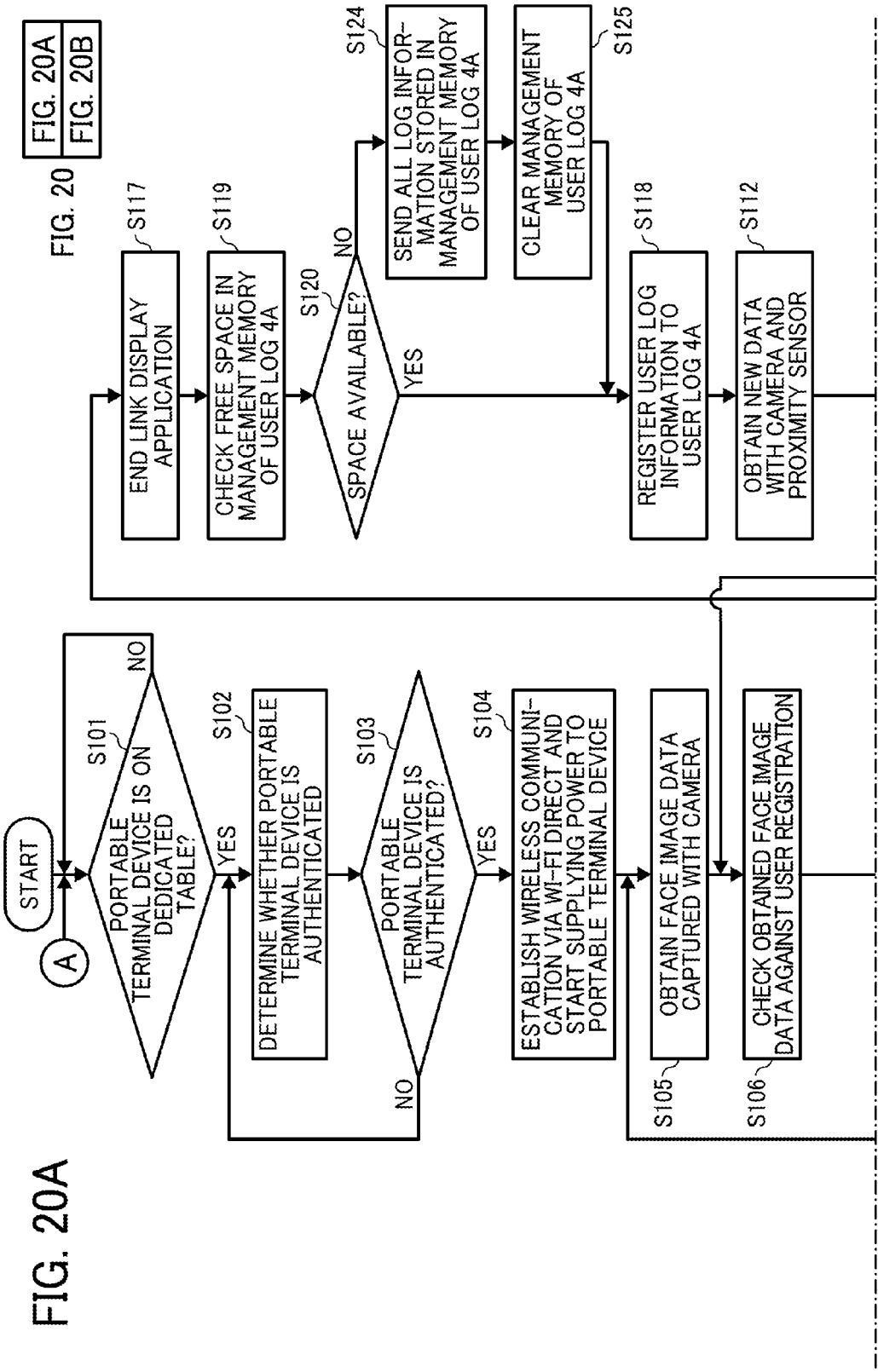

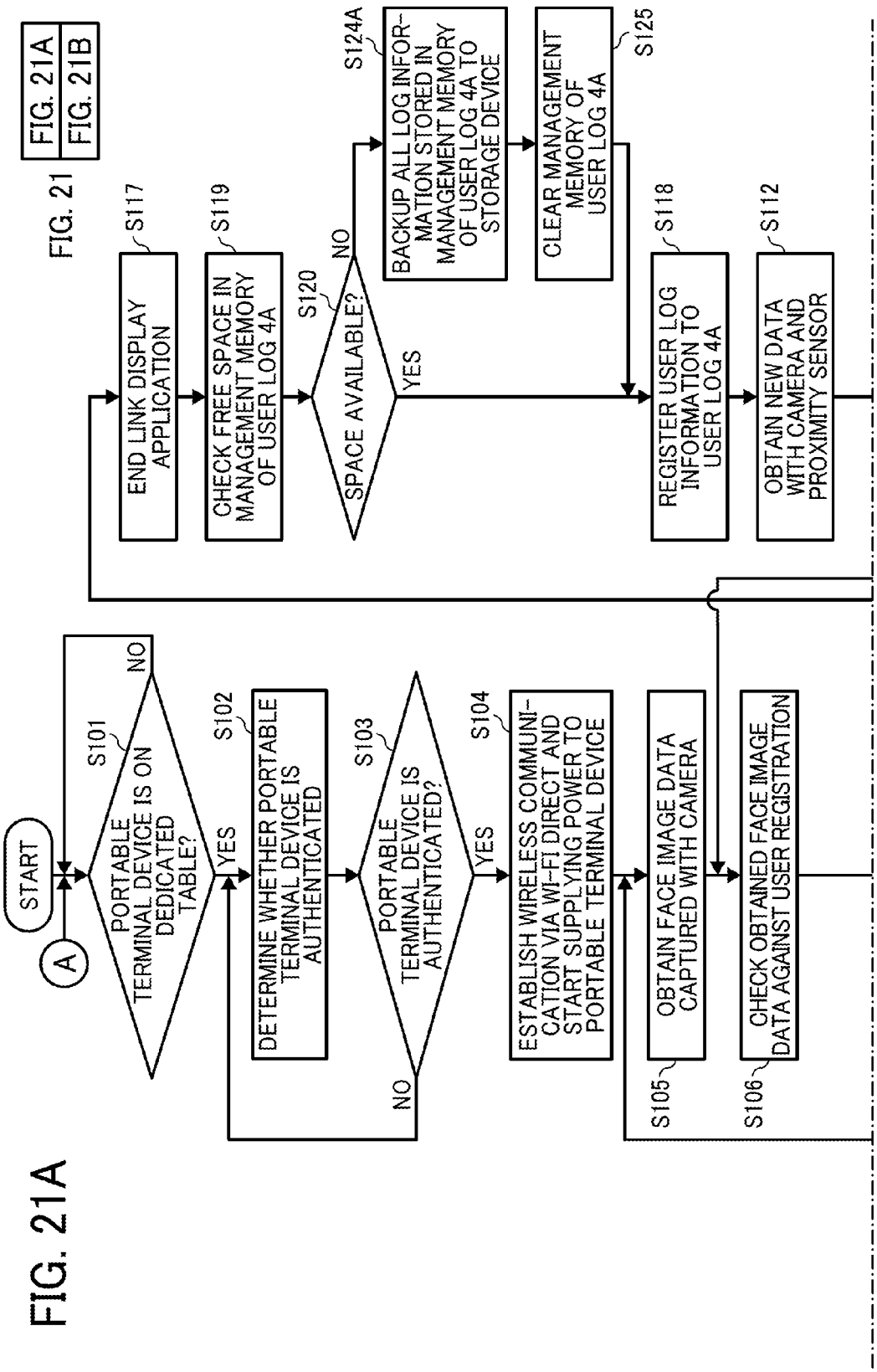

IMAGE PROCESSING APPARATUS, METHOD FOR CONTROLLING IMAGE PROCESSING APPARATUS, ELECTRONIC APPARATUS, AND NON-TRANSITORY RECORDING MEDIUM

CROSS-REFERENCE TO RELATED APPLICATION

This patent application is based on and claims priority pursuant to 35 U.S.C. §119(a) to Japanese Patent Application Nos. 2015-236689, filed on Dec. 3, 2015 and 2016-094045, filed on May 9, 2016, in the Japan Patent Office, the entire disclosures of which are hereby incorporated by reference herein.

BACKGROUND

Technical Field

Embodiments of the present discloser relate to an image processing apparatus, a method for controlling the image processing apparatus, an electronic apparatus, and a non-transitory recording medium.

Related Art

In recent years, portable terminal devices such as smart phones and tablet terminals have been spread through a consumer market. With this change, demand for and chances of using such portable terminal devices as a business use continues to increase. In view of this, a link operation system in which an image processing apparatus and the portable terminal device are linked with each other by establishing wireless connection therebetween to operate in conjunction with each other has been devised. With the link operation system, the portable terminal device displays, as a remote screen, a screen that is same with an operation screen of the image processing apparatus used for setting and operating functions of the image processing apparatus. This remote screen enables a user at the portable terminal device to operate the image processing apparatus through the remote screen. In operation, in the link operation system, the display of the portable terminal device displays the remote screen based on screen data received from the image processing apparatus.

The portable terminal device sends information indicating operation accepted with the remote screen to the image processing apparatus, and then the image processing apparatus generates next screen data based on the information received from the portable terminal device. The image processing apparatus sends the generated screen data to the portable terminal device, and then the portable terminal device updates the remote screen based on the received screen data.

SUMMARY

An image processing apparatus includes circuitry to authenticate a first user, a display to display an initial screen to the first user, after the first user is authenticated, and a communication device to wirelessly communicate with a portable terminal device operated by the first user to control a display of the portable terminal device to display an additional initial screen based on display contents of the initial screen. The circuitry further determines whether at least one of the image processing apparatus and the portable terminal device is not in use. Based on a determination indicating that the at least one of the image processing apparatus and the portable terminal device is not in use, the circuitry determines whether any user is present at the image processing apparatus, using a detector that detects human presence at the image processing apparatus to generate a first determination result.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 12B is a front view illustrating a screen of the control panel of the portable terminal device of FIG. 2 when the copy application function is performed by the image processing apparatus of FIG. 1;

FIG. 13A is a front view illustrating a screen of the control panel of the image processing apparatus of FIG. 1 performing a scanner application function;

FIG. 14A is a front view illustrating a screen of the control panel of the image processing apparatus of FIG. 1 performing a printer application function;

FIG. 14B is a front view illustrating a screen of the control panel of the portable terminal device of FIG. 2 when the printer application function is performed by the image processing apparatus of FIG. 1;

FIG. 15A is a front view illustrating a screen of the control panel of the image processing apparatus of FIG. 1 performing a user authentication function;

FIG. 16 is a flowchart illustrating a process performed by the image processing apparatus of FIG. 1 based on a second example;

FIGS. 17A and 17B (FIG. 17) are a flowchart illustrating a process performed by the image processing apparatus of FIG. 1 based on a third example;

FIGS. 18A and 18B (FIG. 18) are a flowchart illustrating a process performed by the image processing apparatus of FIG. 1 based on a fourth example;

FIG. 19A is a front view illustrating a screen related to a first exemplary operation in the process illustrated in FIG. 18, which is performed by the image processing apparatus of FIG. 1;

FIGS. 20A and 20B (FIG. 20) are a flowchart illustrating a process performed by the image processing apparatus of FIG. 1 based on a fifth example; and FIGS. 21A and 21B (FIG. 21) are a flowchart illustrating a process performed by the image processing apparatus of FIG. 1 based on a sixth example.

DETAILED DESCRIPTION

Figure 1:
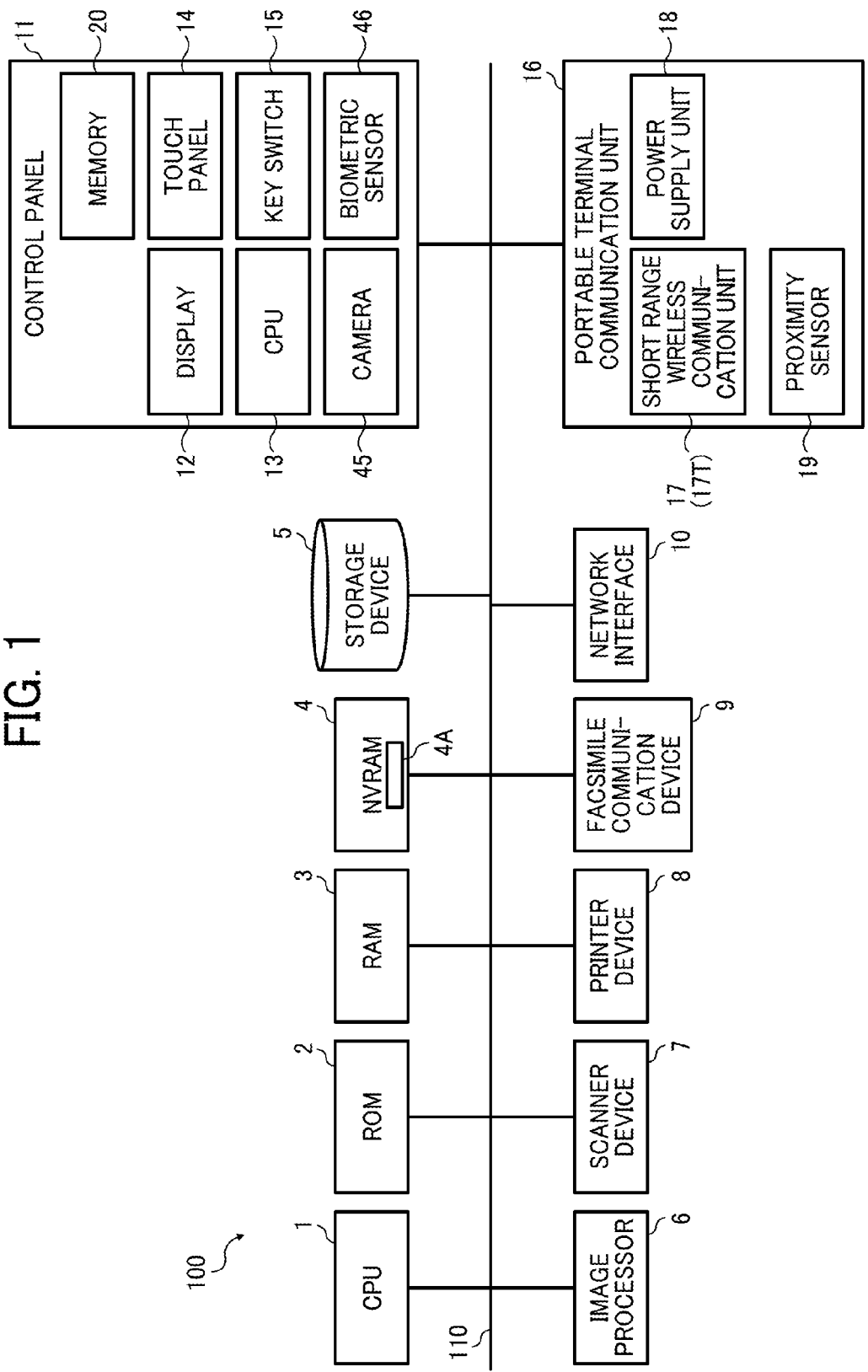
FIG. 1 is a block diagram illustrating a configuration of an image processing apparatus according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

In a link operation system, display contents of screens of an image processing apparatus and a portable terminal device are linked with each other. While the display contents are linked with each other, transition to a power saving mode at the image processing apparatus is prevented, even when one of the image processing apparatus and the portable terminal device is not in use. In this way, the same user can continuously use the image processing apparatus. However, this may cause a security problem as a different user can use the image processing apparatus during the link operation, for example, right after the user has left. On the other hand, if the link operation system prohibits any user from using after a certain time has passed since the last user has used, the same user who can use the link operation system is not able to use the image processing apparatus smoothly and user operability lowers.

In view of the above, the inventor of the present invention has realized that there is a need for a link operation system capable of allowing the same user to continuously operate the link operation system even after a certain time passes to increase the user operability, while at the same time increasing the security level.

A description is now given of exemplary embodiments of the disclosure. The same reference numerals will be assigned to the same or like elements throughout the drawings. One embodiment of the disclosure is related to an image processing system including an image processing apparatus 100, such as a multifunction peripheral (MFP), and a portable terminal device 200. The portable terminal device 200 in the embodiments includes, for example, a smart phone and a tablet terminal.

Figure 2:
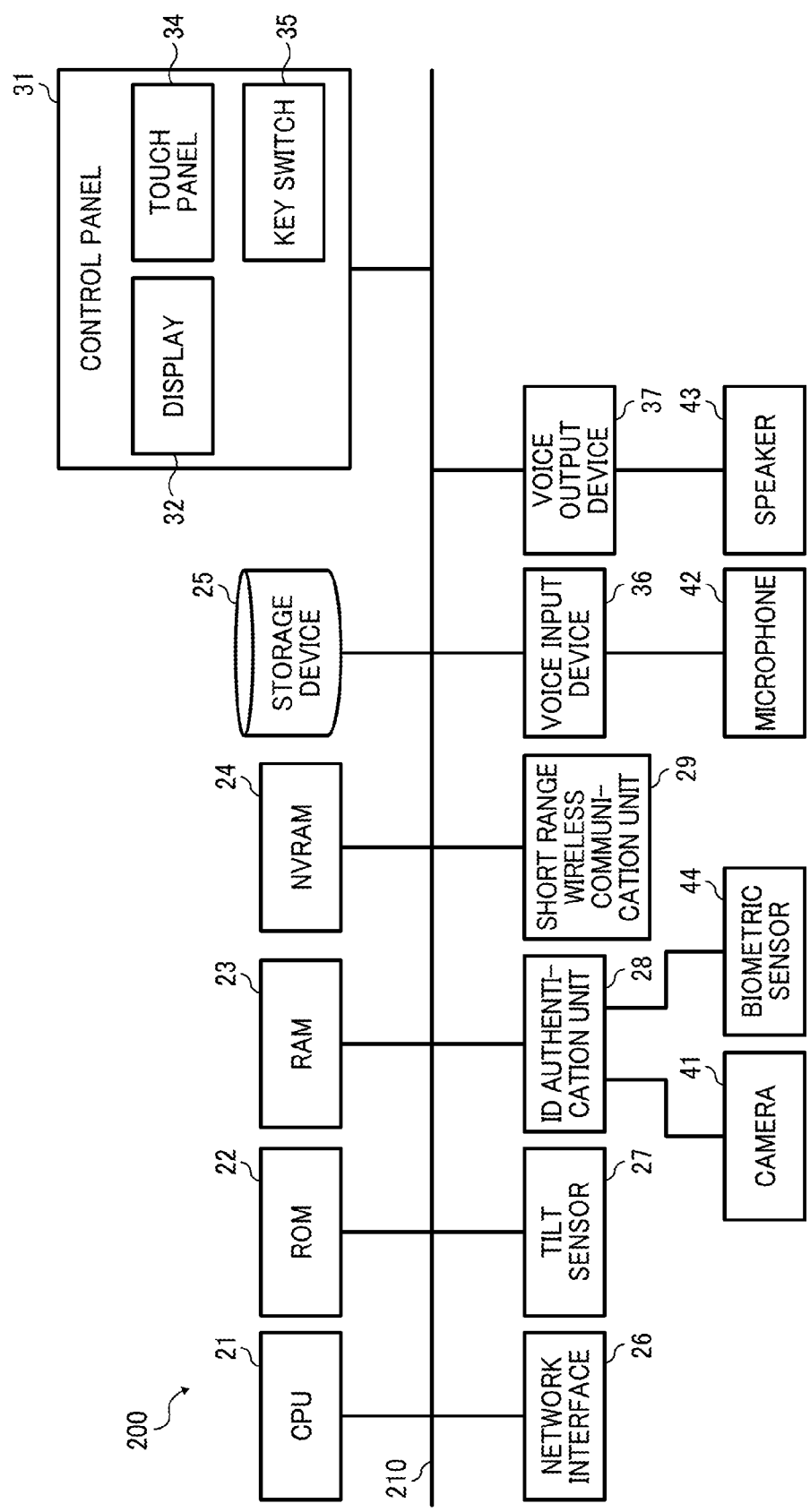
FIG. 2 is a block diagram illustrating a configuration of a portable terminal device used in conjunction with the image processing apparatus of FIG. 1.

FIG. 1 is a block diagram illustrating a configuration of an image processing apparatus 100 according to an embodiment. FIG. 2 is a block diagram illustrating a configuration of a portable terminal device 200 used and operating in conjunction with the image processing apparatus 100 of FIG. 1. The image processing apparatus 100 prevents the image processing apparatus 100 from transitioning to a power saving mode when one of the image processing apparatus 100 and the portable terminal device 200 is not in use. The image processing apparatus 100 ensures security in case that a user changes to another user when operating in conjunction with the portable terminal device 200 (link operation). The image processing apparatus 100 further provides functions without hampering convenience when the same user uses the image processing apparatus 100 after a certain period has passed since the user used the last time. That is, the image processing apparatus 100 identifies a user and allows or denies the user to use the image processing apparatus 100, namely determines whether the user is registered as an authorized user.

In FIG. 1, the image processing apparatus 100 includes a central processing unit (CPU) 1, a read only memory (ROM) 2, a random access memory (RAM) 3, a non-volatile random access memory (NVRAM) 4, a storage device 5, an image processor 6, a scanner device 7, a printer device 8, a facsimile communication device 9, and a network interface 10. The image processing apparatus 100 further includes a control panel 11 and a portable terminal communication unit 16. The above-mentioned elements 1 to 11 and 16, which may be implemented by circuits, are connected to each other through a bus 110.

The CPU 1 is a processor that controls operation of the image processing apparatus 100. The CPU 1 mainly executes an Operating System (OS) program, and further executes middleware and various types of application programs. The CPU 1 also controls contents of display (display contents) displayed with the control panel 11. The ROM 2 stores various types of programs, including the OS program. According to the programs stored in the ROM 2, the CPU 1 executes various types of processing to achieve various functions of the image processing apparatus 100. The ROM 2 stores, in particular, programs executed by the CPU 1 to control a sequence of operations of the image processing apparatus 100. The RAM 3 is used as a work memory to temporarily store data, and also used as an image memory to store image data, when the CPU 1 executes the processing based on the programs. The NVRAM 4 is a non-volatile memory (flash memory) that can keep and retrieve stored contents without deleting the contents even after having been turned off and back on. The NVRAM 4 stores various types of setting information. Here, the NVRAM 4 includes a memory area of user log 4A. The storage device 5 is a non-volatile high-capacity storage device such as a hard disc drive. The storage device 5 stores history information associated with the OS program, the various types of application programs, print data and image data, and jobs.

The image processor 6 processes the image data. For example, the image processor 6 rescales (enlarges or reduces) an image size, rotates an image, converts the print data into the image data (rasterizing processing), and compresses and expands the image data. The image processor 6, here, performs a predetermined image processing on image data, which is read with a scanner device 7 or received with the facsimile communication device 9 or via the network interface 10. The scanner device 7 optically reads an original image, and outputs image data of the original image in a predetermined format. The scanner device 7 includes, for example, a light source to irradiate a document with light, a line image sensor to read an image on the document in a width direction line by line with the light reflected from the document surface, and a carriage to move a reading position on the document by unit of line in a longitudinal direction. The scanner device 7 further includes an optical system such as a lens and a mirror that guides the reflected light from the document to the line image sensor to form an image and a convertor to convert an analog image signal output from the line image sensor into image data. The printer 8 forms an image on a recording medium based on the image data, which may be output by the scanner device 7 or received from the outside. The printer 8 is a laser printer that includes a transfer device to transfer the recording medium, a photoconductor drum, a charging device, a laser unit, a developing device, a transfer-separating device, a cleaning device, and a fixing device, etc., and forms an image by an electrophotographic process. The printer 8 may use other process than the above-mentioned process to form an image, such as ink-jet printing process.

The facsimile communication device 9 is connected to, for example, a public telephone line and communicates with other facsimile communication devices to transfer (send and receive) image data. The network interface 10 is connected to a network, such as a local area network (LAN) including Wi-Fi direct and a wide area network (WAN) and communicates with a cloud computing resource, a server, other terminal device, and the like to transfer (send and receive) data.

The control panel 11 includes a display 12, a CPU 13, a touch panel 14, a key switch 15, a camera 45, a biometric sensor 46, and a memory 20. The display 12 may be, for example, a liquid crystal display and displays character data and image data. The CPU 13 identifies a person, namely a user, based on a face image captured with the camera 45 or a fingerprint image sensed with the biometric sensor 46. The face image and the fingerprint image, which are personal data (personal ID information) obtained as described above, are used to determine whether the person is authorized to use the image processing apparatus 100 by checking the personal data against a personal data file (file of registration) that is registered in the memory 20 of the control panel 11 in advance. The final determination of permission or inhibition of use may depends on face image authentication, biometric authentication, or both of the face image authentication and the biometric authentication. The touch panel 14 inputs predetermined information data in response to a touch action of the user. The key switch 15 inputs predetermined information data in response to an event the key switch 15 is pushed down. The biometric sensor 46 such as a fingerprint sensor and a vein sensor is a sensor that recognizes a human. In this embodiment, the personal data file (file of registration) is stored in the memory 20 of the control panel 11. In another example, the storage device 5 may store the file of the registration. In such case, the CPU 1 may check the obtained ID information against the file of registration stored in the storage device 5 to perform the authenticating processing. In another example, the personal data file may be stored in any server accessible by the control panel 11 through a network. In another example, only part of the file of registration may be stored in the memory 20, while the entire file of the registration may be stored in the storage device 5 or any other memory on the network. For example, the personal data file for a group of users who frequently use the control panel 11 (that is, the image processing apparatus 100) may be stored in the memory 20, while the entire personal data file additionally including other users may be stored in the storage device 5 or the memory on the network.

According to the embodiment, the CPU 1 controls the display contents displayed with the control panel 11 and acceptance operation via the control panel 11. The touch panel 14 is provided on the display 12. The touch panel 14 detects a coordinate position that is touched by a touch pen or a finger on the display 12, a flic operation, and a drag operation.

The portable terminal communication unit 16 includes a short range wireless communication unit 17, power supply unit 18, and proximity sensor 19. The portable terminal communication unit 16 is a stand holder and a docking station that includes a dedicated table 17T to hold and fix the portable terminal device 200. The portable terminal communication unit 16 performs wireless-communication in short range, which has a relatively low communication speed. Examples of a short range wireless communication system in use include, for example, near field communication (NFC), Bluetooth (Registered trade name), Zigbee (Registered trade name). The portable terminal communication unit 16 automatically communicates with a short range wireless communication unit 29 of the portable terminal device 200, when the portable terminal device 200 is placed on the dedicated table 17T of the portable terminal communication unit 16. The portable terminal communication unit 16 reads identification (ID) information included in the portable terminal device 200 via the dedicated table 17T, and then checks the read identification (ID) information, against registered ID information stored in the image processing apparatus 100 in advance. Through this, the portable terminal communication unit 16 automatically performs authentication processing to authenticate the portable terminal device 200. The short range wireless communication unit 17 includes the dedicated table 17T on which the portable terminal device 200, which may be belonging to the user, or supplied to the user from a company or an organization, is placed. When the portable terminal device 200 is placed anywhere on the dedicated table 17T, the short range wireless communication unit 17 automatically performs the authentication processing using the ID information. The short range wireless communication unit 17 performs wireless communication with the portable terminal device 200. The short range wireless communication unit 17 sends and receives authentication data to connect with the portable terminal device 200 that obtains permission of use of the image processing apparatus 100 in advance and is registered in the image processing apparatus 100 in advance. The power supply unit 18 feeds power to the portable terminal device 200 when the portable terminal device 200 is put on the dedicated table 17T so that the portable terminal device 200 can automatically charges a battery. The power supply unit 18 controls feeding power according to a presence or absence of the portable terminal device 200. The proximity sensor 19 is, for example, an infrared sensor and a pyro-electric sensor, and outputs a detection signal when sensing an object, or a body, getting closer or being in a predetermined distance.

According to the embodiment, the CPU 1 determines whether the image processing apparatus 100, which is the own apparatus, is in use. This will be described later. When the CPU 1 that is executing a link display application (link processing) receives, from the portable terminal device 200, information indicating contents of operation (operation contents) in association with a control panel 31 of the portable terminal device 200, the CPU 1 analyzes and recognizes the operation contents and reflects the analyzed and recognized information to the image processing apparatus 100, which is the own apparatus. The CPU 1 sends information associated with a predetermined setting screen (initial screen), which is currently displayed on the display 12, to the portable terminal device 200 through the network interface 10. Here the network interface 10 has a Wi-Fi Direct connection. The predetermined setting screen is previously set by, for example, according to a user or a designer preference.

Referring to FIG. 2, the portable terminal device 200 includes a CPU 21, a ROM 22, a RAM 23, and a NVRAM 24, a storage device 25, a network interface 26, a tilt sensor 27, and a personal ID authentication unit 28, and the short range wireless communication unit 29. The personal ID authentication unit 28 is connected to a camera 41 and a biometric sensor 44. The portable terminal device 200 further includes the control panel 31, a voice input device 36, and a voice output device 37. The control panel 31 includes a touch panel 34 and a key switch 35. The voice input device 36 is connected to a microphone 42. The voice output device 37 is connected to a speaker 43. The above-mentioned elements 21 to 29, 31, 36, and 37, which may be implemented by circuits, are connected to each other through a bus 210.

The CPU 21 mainly executes an OS program, and further executes middleware and various types of application programs to control the entire operation of the portable terminal device 200. The CPU 21 also controls display contents displayed with the control panel 31. The ROM 22 stores various types of programs. According to the programs stored in the ROM 22, the CPU 21 executes various types of processing to achieve functions of the portable terminal device 200. The ROM 22 also stores programs executed by the CPU 1 to control a sequence of operations of the portable terminal device 200, and user information. The RAM 23 is used as a work memory to temporarily store data, and also used as an image memory to store image data, when the CPU 21 executes the processing based on the programs. The NVRAM 24 is a non-volatile memory (flash memory) that can keep and retrieve stored contents without deleting the contents even after having been turned off and back on. The NVRAM 4 stores various types of setting information. The storage device 25 is a non-volatile high-capacity storage device such as a hard disc drive. The storage device 25 stores, for example, the OS program, the various types of application programs. The storage device 25 also stores a program to operate the portable terminal device 200 in a link display mode (hereinafter, the program may be referred to as a link display application).

The network interface 26 is connected to a network, such as a LAN including Wi-Fi direct via which data communication between the image processing apparatus 100 and other external devices is performed. Here in the embodiments, the network interface 26 performs wireless communication via a wireless LAN, but means of communication is not limited to this. The display 32 of the control panel 31 may be, for example, a liquid crystal display and displays various screens including an operation screen and a setting screen. According to the embodiment, the CPU 21 controls the display contents displayed with the control panel 31 and acceptance operation via the control panel 31. The touch panel 34 is provided on the display 32. The touch panel 34 detects a coordinate position that is touched by a touch pen or a finger on the display 32, a flic operation, and a drag operation. The tilt sensor 27 detects a direction that the display 32 of the portable terminal device 200 inclines, which may be said as tilt of the portable terminal device 200. To detect the tilt, any method may be used. For example, the tilt sensor 27 performs detection using a sensor provided, such as a gyro sensor and an electronic compass. The portable terminal device 200 recognizes whether a surface of a screen display of the display 32 displays in a longitudinal direction or in a lateral direction by detecting the tilt of the own device by the tilt sensor 27.

The personal ID authentication unit 28, the camera 41, and the biometric sensor 44 respectively have almost the same function and configuration as the personal CPU 13, the camera 45, and the biometric sensor 46 of FIG. 1.

The short range wireless communication unit 29 includes a function of performing wireless communication using a predetermined short range wireless communication system, which includes, for example, NFC, Bluetooth, and Zigbee. The short range wireless communication unit 29 automatically communicates with the short range wireless communication unit 17 built in the image processing apparatus 100, by placing the portable terminal device on the dedicated table 17T of the image processing apparatus 100. In the above-mentioned communication, the ID information stored inside of the portable terminal device 200 is read out by the short range wireless communication unit 29 to be checked against the ID information registered in the image processing apparatus 100, so that the authentication processing of authenticating the portable terminal device 200 is automatically performed. The voice input device 36 converts human voice obtained with the microphone 42 into digital data. The voice output device 37 converts the digital data that is made and synthesized as voice data into a voice signal, which is an analog signal, to be output as the voice via the speaker 43.

According to the embodiment, the CPU 21 determines whether the portable terminal device 200, which is the own device, is in use. A method to determine, with the CPU 21, whether the portable terminal device 200 is in use will be described later. Additionally, in executing the link display application, the CPU 21 displays, on the control panel 31, individual guidance screens based on information received from the image processing apparatus 100 via the network interface 26. The CPU 21 sends the contents of operation received with the control panel 31 to the image processing apparatus 100 using the network interface 26.

Figure 3:
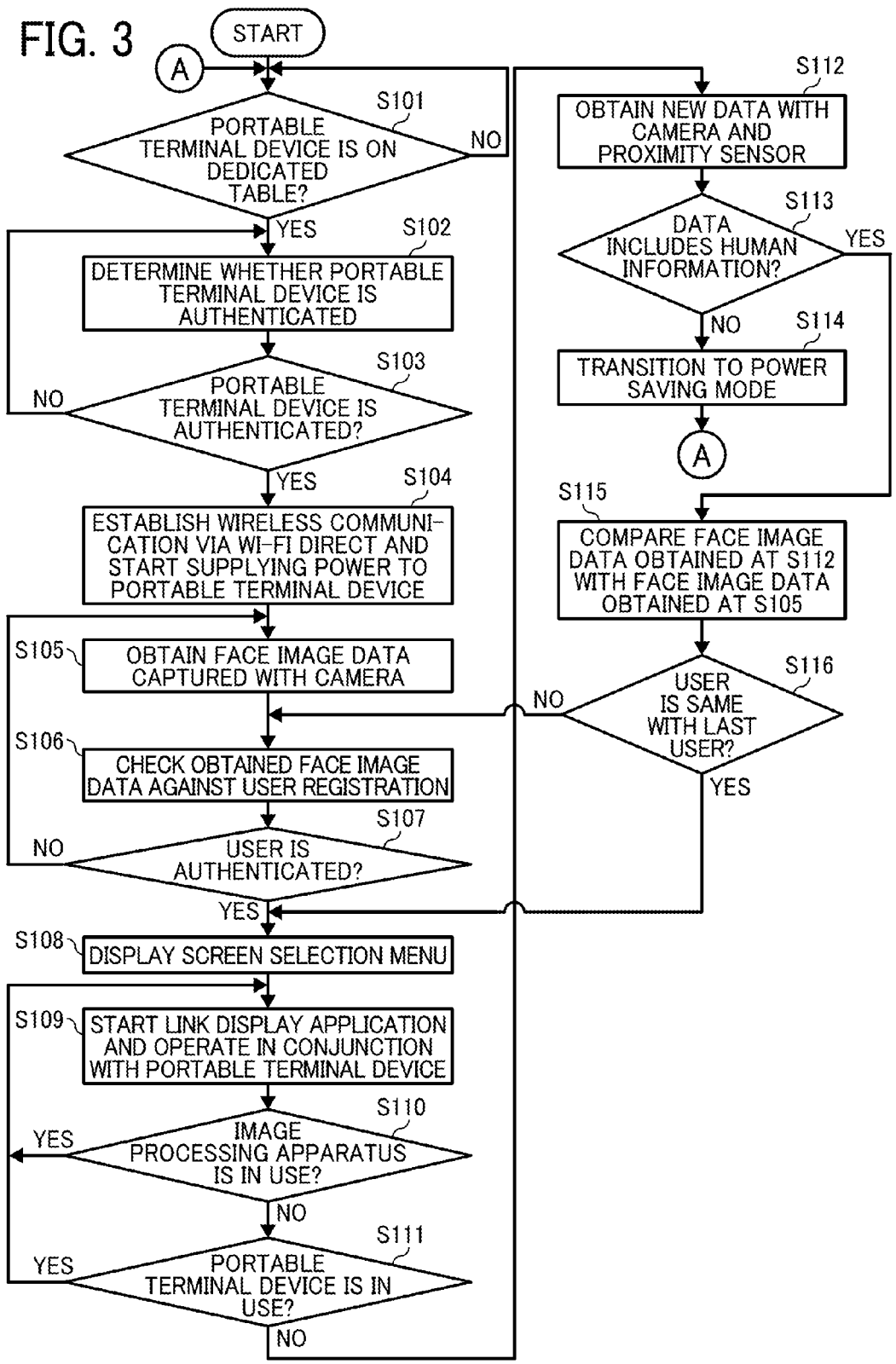
FIG. 3 is a flowchart illustrating an exemplary process performed by the image processing apparatus of FIG. 1 based on a first example.

FIG. 3 is a flowchart illustrating an exemplary process performed by the image processing apparatus 100 of FIG. 1.

In FIG. 3, S101 determines whether a user, who wants to use the image processing apparatus 100, puts the portable terminal device 200, which may be belonging to the user, or supplied to the user from a company or an organization, on the dedicated table 17T of FIG. 1. If the determination of S101 is YES, the short range wireless communication unit 17 built in the portable terminal communication unit 16 detects and connects to the short range wireless communication unit 29 built in the portable terminal device 200. After being connected, the short range wireless communication unit 17 reads out the ID information from the short range wireless communication unit 29 and checks the read ID information against registered ID information stored in the image processing apparatus 100 to automatically determine whether the portable terminal device 200 is authenticated (S102). The process here is based on premise that the portable terminal device 200 is registered in the image processing apparatus 100 in advance. The process at S103 is YES based on the premise and continues to S104.

Right after the above-mentioned authentication, the image processing apparatus 100 establishes actual connection with the portable terminal device 200 via the wireless communication function using, for example, the Wi-Fi Direct. After the actual connection between the image processing apparatus 100 and the portable terminal device 200 is established, the portable terminal communication unit 16, in which the power supply unit 18 is built, starts feeding power to the portable terminal device 200 via the power supply unit 18. As the wireless communication function, other than the Wi-Fi Direct may be used.

Subsequently, when the user, who wants to use the image processing apparatus 100, is front of the image processing apparatus 100, the camera 45 obtains face image data of the user (S105). The face image data obtained by the camera 45 is checked against face image data that is registered in advance to and stored in the file of the registration indicating users who are authorized to use the image processing apparatus 100 (S106). Through this, whether the face image data of the current user matches with the face image data stored in the file of the registration is determined (S107). If S107 determines NO by the process of S106, the process returns to S105. On the other hand, if S107 determines YES by the process of S106 and the personal authentication processing is completed, the process continues as described below. The display 12 of the image processing apparatus 100 or the display 32 of the portable terminal device 200 displays a menu screen to select contents of screen for each display during activation of the link display application is (S108). The menu screen may be referred to as an initial screen or screen selection menu. In response to the display of the menu screen, the user selects an arbitrary screen from the menu displayed (S108).

After the user selects a screen, the link display application, which is downloaded in advance to the portable terminal device 200, is activated to start a link display system of the image processing apparatus 100 and the portable terminal device 200 (S109). The CPU 1 of the image processing apparatus 100 determines whether the own apparatus, which is the image processing apparatus 100, is in use based on, for example, at least one of recognition of a presence of the user detected by the camera 45 and a condition of acceptance of operation from the user. More specifically, the CPU 1 determines that the own apparatus 100 is in use based on the user presence detected by the camera 45, for example, when eyes of the user detected by the camera 45 are looking at the control panel 11, when toes of the user detected are faced with the image processing apparatus 100, or when the same user is present for a predetermined time period. In another example, the CPU 1 determines that the own apparatus 100 is in use based on operation from the user, for example, when a time period does not exceed a certain time from the last acceptance of the user operation. The certain time may be previously set, for example, according to the designer preference. The CPU 21 of the portable terminal device 200 determines whether the own device 200 is in use based on at least one of the recognition of the eyes of the user detected by the camera 41 and the condition of the acceptance of the operation associated with the image processing apparatus 100 from the user. More specifically, the CPU 21 of the portable terminal device 200 determines that the own apparatus 200 is in use when the eyes of the user detected by the camera 41 are looking at the control panel 31 or when a time period does not exceed a certain time from the last acceptance of the operation. The certain time may be previously set, for example, according to a user or a designer preference.

When the CPU 1 determines that the own apparatus 100 is in use (YES at S110) by the above mentioned method, the process returns to S109 to repeats the process. In contrast, when determining that the own apparatus 100 is not in use (NO at S110), the image processing apparatus 100 determines whether the portable terminal device 200 is in use based on information received from the portable terminal device 200 (S111). When the image processing apparatus 100 determines that the portable terminal device 200 is in use (YES at S111), the process returns to S109 to repeats the process. In contrast, when the portable terminal device 200 is not in use (NO at S111), the camera 45 and the proximity sensor 19 obtains new data (S112).

When the new data obtained at S112 includes human information indicating detection of a human body (YES at S113), the CPU 13 compares new face image data obtained at S112 with the face image data obtained at S105 to determine if these two pieces of face image data match with each other (S115). When the data obtained at S112 does not include the human information (NO at S113), the image processing apparatus 100 transitions to a power saving mode (S114), and the process returns to S101. When the two pieces of face image data match with each other, and S116 determines that a current user is the same person with the last user who is authenticated last time (YES at S116), the process returns to S108, and the display 12 or the display 32 displays the menu screen (initial screen) to select contents of screen for each display during activation of the link display application. The user again selects arbitrary screens as the user likes from the menu. When S116 determines that the current user is not the same person with the last user who is authenticated last time (NO at S116), the process returns to S106 and the CPU 13 checks the new face image data against the file of the registration indicating users who are authorized to use and registered in advance to the image processing apparatus 100. Through this, the CPU 13 determines whether the face image data of the current user matches with the face image data stored in the file of the registration.

Figure 4:
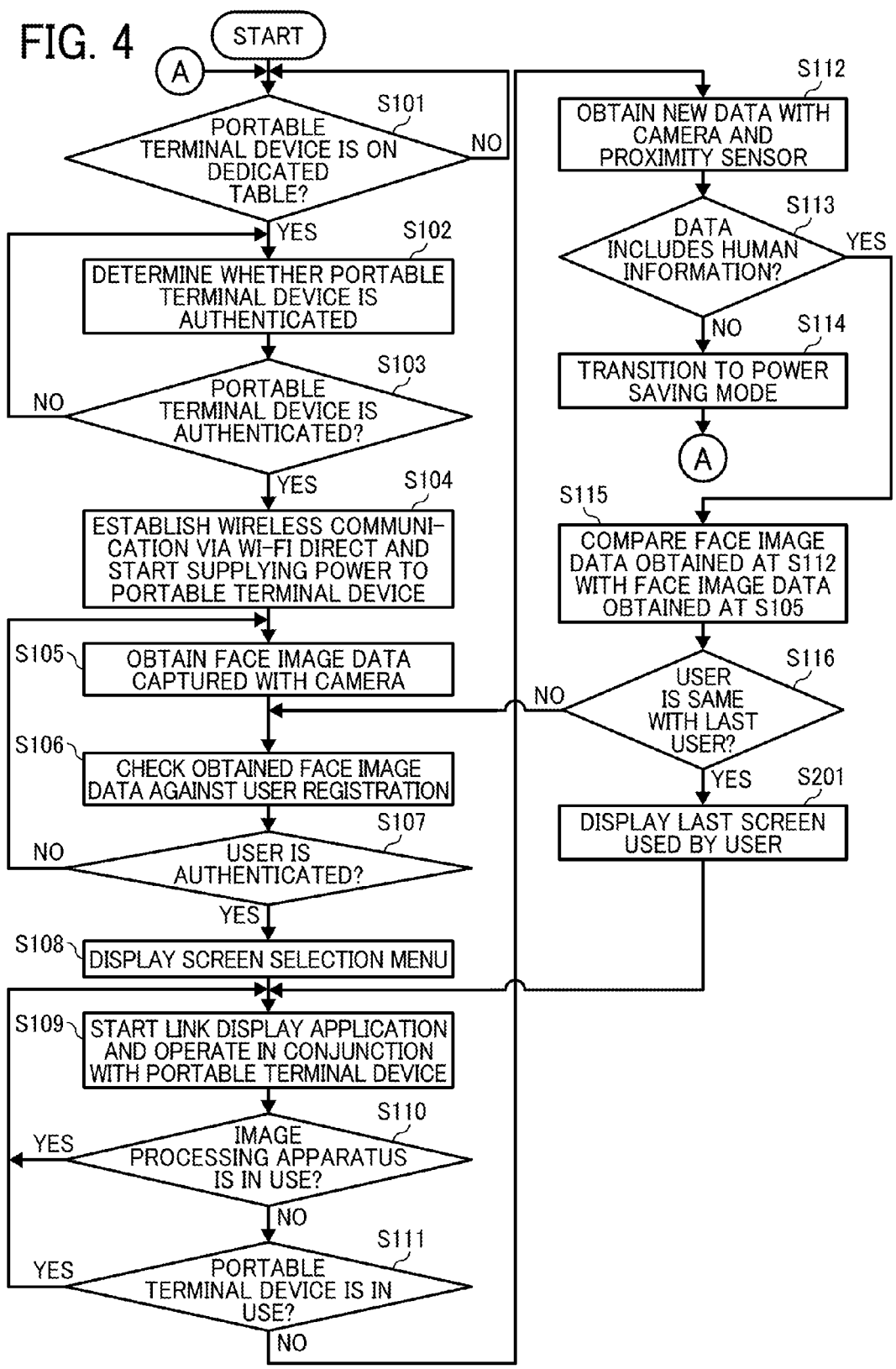
FIG. 4 is a flowchart illustrating another exemplary process performed by an image processing apparatus of FIG. 1 based on the first example.

FIG. 4 is a flowchart illustrating another exemplary process performed by the image processing apparatus 100 of FIG. 1. The process illustrated in FIG. 4 is different from the process illustrated in FIG. 3 in that the process performs S201 and then continues to S109 when the determination of S201 is YES. Detail of the difference will be described below.

In FIG. 4, when S116 determines that the current user is the same person with the last user who is authenticated last time (YES at S116), the display 12 and the display 32 each display the same screen with the last screen that the user used last time (S201), and then the process continues to S109. When S116 determines that the current user is not the same person with the last user who is authenticated last time (NO at S116), the process returns to S106 and the new face image data is checked against the file of the registration indicating users who are authorized to use and registered in advance to the image processing apparatus 100. Through this, the CPU 13 determines whether the face image data of the current user matches with the face image data stored in the file of the registration.

Figure 5:
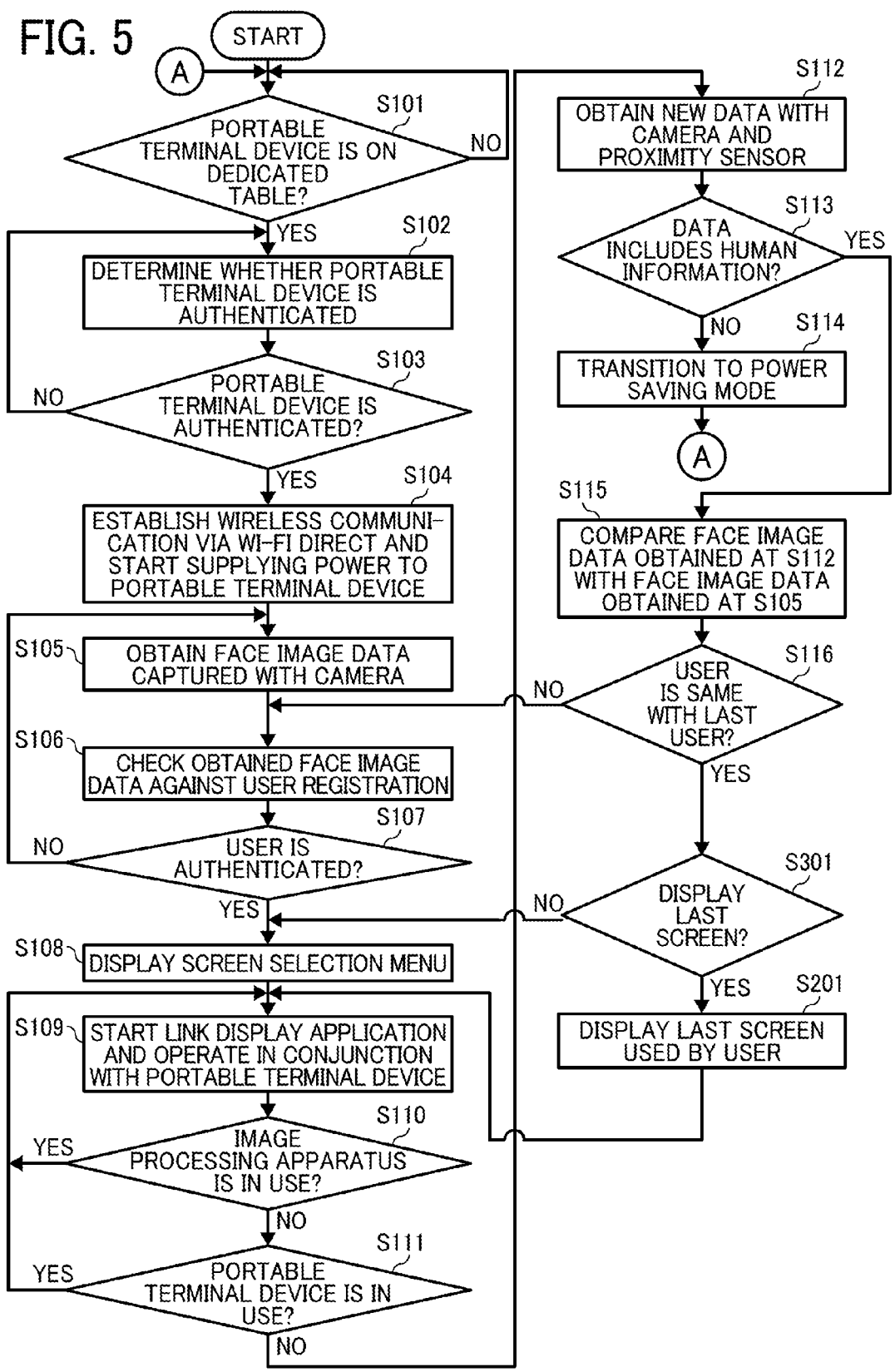
FIG. 5 is a flowchart illustrating still another exemplary process performed by the image processing apparatus of FIG. 1 based on the first example.

FIG. 5 is a flowchart illustrating a still another exemplary process performed by the image processing apparatus 100 of FIG. 1. The process illustrated in FIG. 5 is different from the process illustrated in FIG. 4 in that the process performs S301 and then continues to S201 when the determination of S201 is YES. Detail of the difference will be described below.

S301 of FIG. 5 determines whether to display the screen that is selected last time, and if YES, the process continues to S201, while if NO, the process continues to S108.

Figure 6:
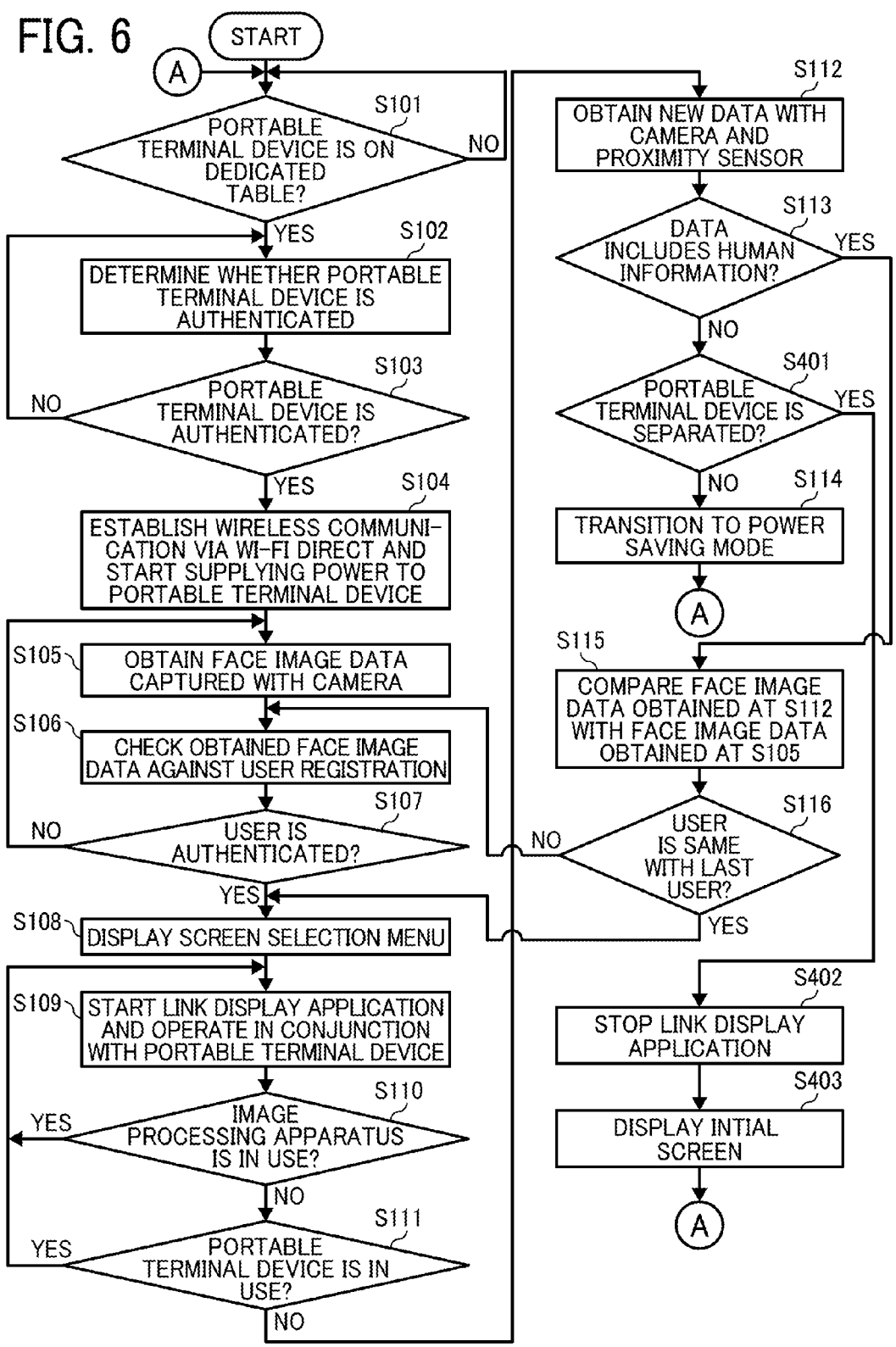
FIG. 6 is a flowchart illustrating still another exemplary process performed by an image processing apparatus of FIG. 1 based on the first example.

FIG. 6 is a flowchart illustrating a still another exemplary process performed by the image processing apparatus 100 of FIG. 1. The difference between the process of FIG. 6 and the process of FIG. 3 is described below.

(1) The process of FIG. 6 adds S401 between S113 and S114, which is branch processing.

(2) The process of FIG. 6 performs S402 to S403 if the determination at S401 is YES. While if the determination at S401 is NO, the process continues to S114. Detail of the difference will be described below. Here, additional steps of the process illustrated in FIG. 6 may be applied to the processes illustrated in FIG. 4 and FIG. 5.

When S113 of FIG. 6 determines that the obtained new data does not include the human information (NO at S113), the portable terminal communication unit 16 attempts to connect with the short range wireless communication unit 29 via the short range wireless communication unit 17 to determine whether the portable terminal device 200 is on the dedicated table 17T (S401). When the portable terminal communication unit 16 receives a response signal from the short range wireless communication unit 29, which means that the portable terminal device 200 is still on the dedicated table 17T, the determination at S401 is NO, and the process continues to S114.

When the portable terminal communication unit 16 does not receive the response signal from the short range wireless communication unit 29, which means that the portable terminal device 200 is separated from the portable terminal communication unit 16, the determination at S401 is YES, and the CPU 1 stops the link display application (S402). After finishing the link display application, the image processing apparatus 100 changes the screen to display the initial screen which is the original screen displayed in a standalone mode (a state that the image processing apparatus 100 operates alone without linking to operation of the portable terminal device 200) (S403), and the process returns to S101.

Figure 7:
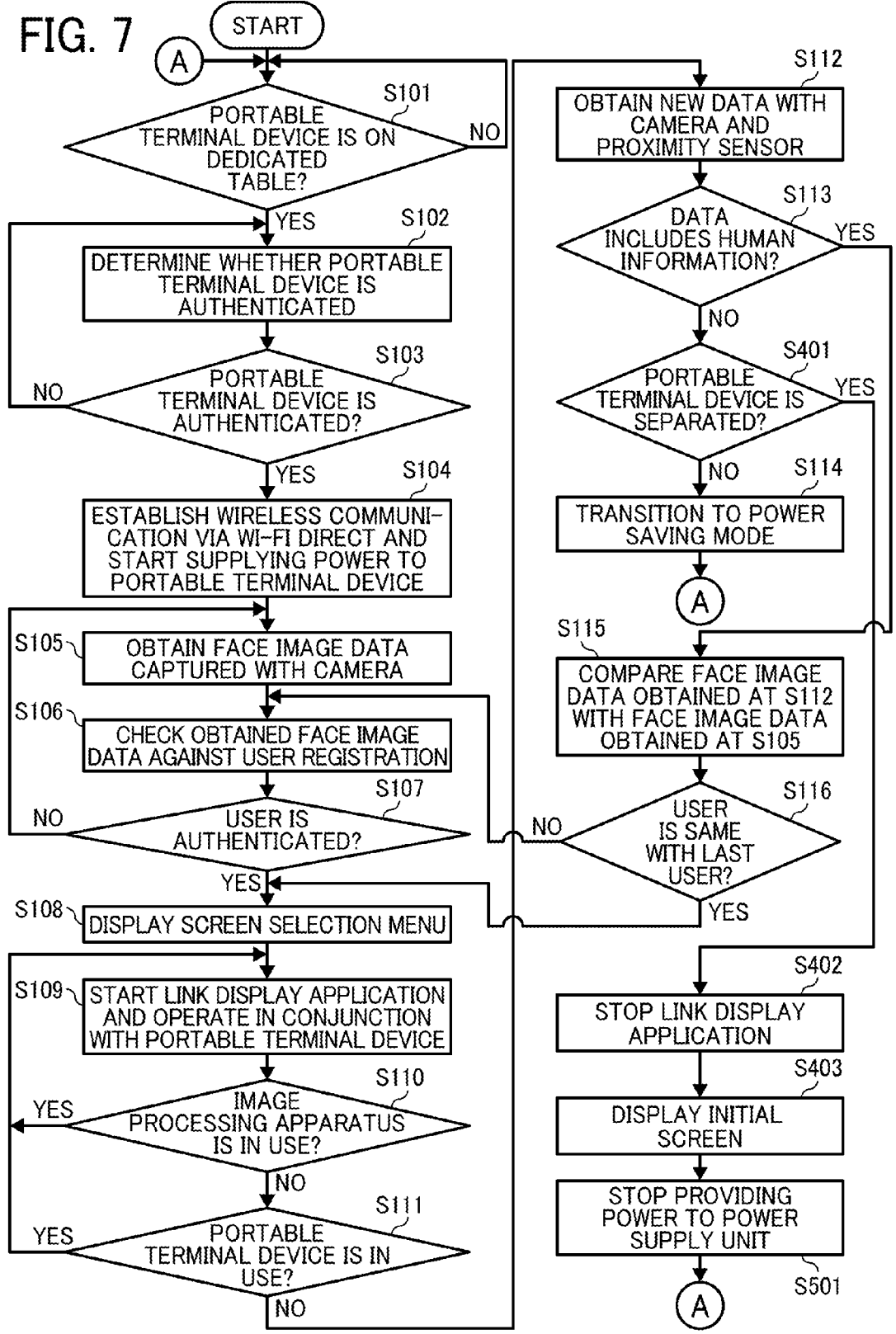
FIG. 7 is a flowchart illustrating still another exemplary process performed by an image processing apparatus of FIG. 1 based on the first example.

FIG. 7 is a flowchart illustrating a still another process performed by the image processing apparatus 100 of FIG. 1. The process illustrated in FIG. 7 is different from the process illustrated in FIG. 6 in that the process performs S501 after the S403. Detail of the difference will be described below.

At S403 of FIG. 7, the image processing apparatus 100 displays the initial screen which is the original screen displayed in a standalone mode (a state that the image processing apparatus 100 operates alone without linking to operation of the portable terminal device 200). After that, the portable terminal communication unit 16 stops to supply power to the power supply unit 18 to stop feeding power to the portable terminal device 200 (S501), because S401 determines that the portable terminal device 200 is separate from the image processing apparatus 100.

Figure 8:
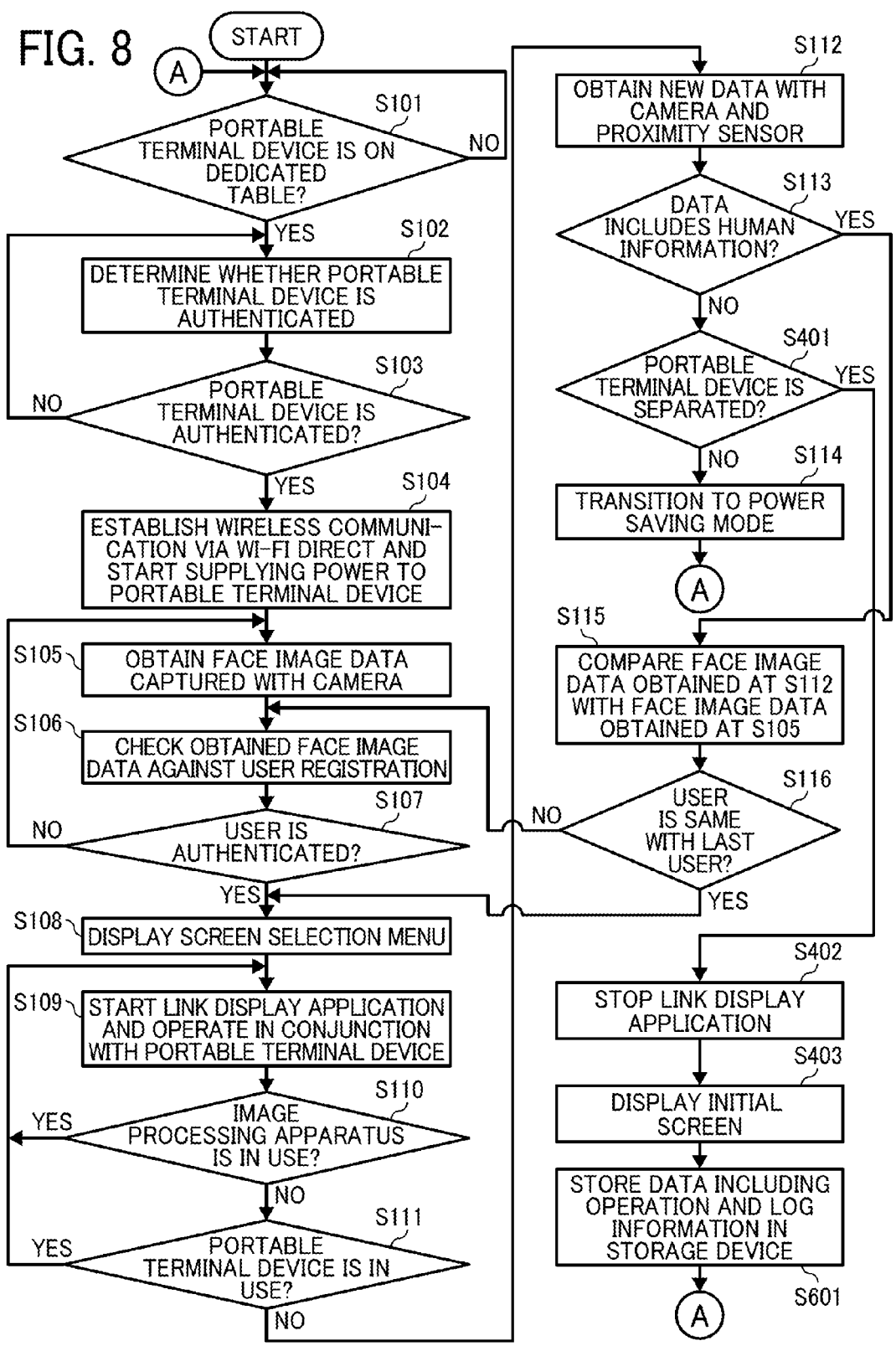
FIG. 8 is a flowchart illustrating still another exemplary process performed by an image processing apparatus of FIG. 1 based on the first example.

FIG. 8 is a flowchart illustrating a still another process performed by the image processing apparatus 100 of FIG. 1. The process illustrated in FIG. 8 is different from the process illustrated in FIG. 7 in that the process performs S601 instead of S501. Detail of the difference will be described below. Here, S501 of the process illustrated in FIG. 7 may be performed after S601 of the process illustrated in FIG. 8.

At S403 of FIG. 8, the image processing apparatus 100 displays the initial screen which is the original screen displayed in a standalone mode (a state that the image processing apparatus 100 operates alone without linking to operation of the portable terminal device 200). Subsequently, the image processing apparatus 100 stores log information including, for example, user information, device information, date information, operation process information, application information, and image data as history data (S601). The user information indicates, for example, a user who performed a sequence of operations. The device information indicates, for example, an identification of a portable terminal device used. The date information indicates, for example, a time when the user logs in. The operation process information indicates, for example, procedure of operation performed by the user. The application information indicates, for example, an application used by the user.

Figure 9A:
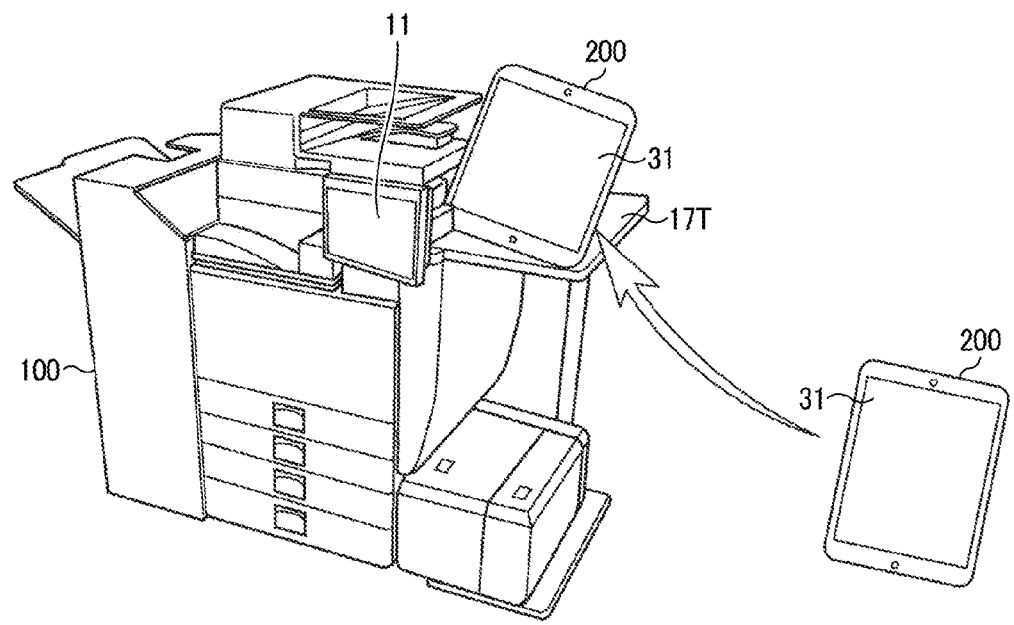
FIG. 9A is a perspective view illustrating the image processing apparatus of FIG. 1 and the portable terminal device of FIG. 2, when the portable terminal device is put on a dedicated table of the image processing apparatus to establish a link operation system between the image processing apparatus and the portable terminal device.
Figure 9B:
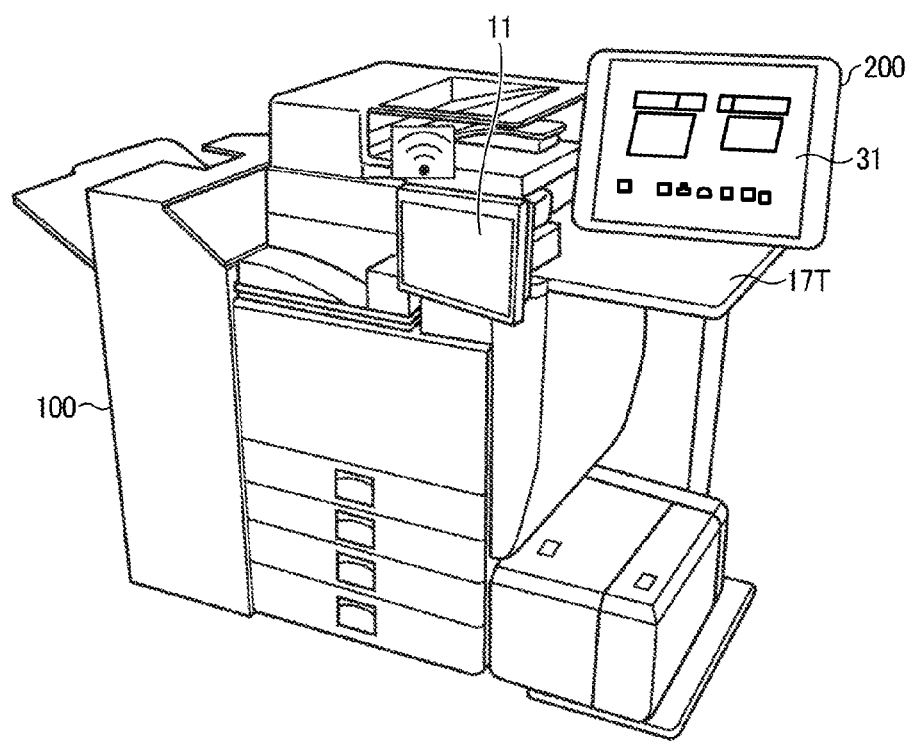
FIG. 9B is a perspective view illustrating the image processing apparatus of FIG. 1 and the portable terminal device of FIG. 2, when the portable terminal device is put on the dedicated table of the image processing apparatus to perform a link operation.

FIG. 9A is a perspective view illustrating the image processing apparatus 100 of FIG. 1 and the portable terminal device 200 of FIG. 2, when the portable terminal device 200 is put on a dedicated table 17T of the image processing apparatus 100 to establish a link operation system between the image processing apparatus 100 and the portable terminal device 200. FIG. 9B is a perspective view illustrating the image processing apparatus 100 of FIG. 1 and the portable terminal device 200 of FIG. 2, when the portable terminal device 200 is put on the dedicated table 17T of the image processing apparatus 100 to perform a link operation. FIGS. 9A and 9B are perspective views each illustrating the image processing apparatus 100 and the portable terminal device 200 to explain an example of operation of the link display system. The link display system includes the image processing apparatus 100 and the portable terminal device 200. The portable terminal device 200 is a terminal device such as a portable tablet and includes the control panel 31 including the display 32 and the touch panel 34, and the key switch 35.

The image processing apparatus 100 is an electronic apparatus, such as a multifunction peripheral (MFP), that performs a plurality of jobs including (1) a copy job which, for example, optically reads an image of a document and copies and prints-out the image on a recording medium, (2) a scan job which, for example, reads image data of a document, saves the read image data as, for example, a file and sends the file to an external device, (3) a print job which, for example, prints-out an image associated with data sent from a personal computer on a recording medium and outputs the recording medium.

The image processing apparatus 100 includes the control panel 11 including the display 12, the touch panel 14, and key switch 15 (see FIG. 1). The user can perform various settings using the control panel 11.

In FIG. 9A, the user puts the portable terminal device 200, which is belonging to an individual or a group, on the dedicated table 17T (cradle) of the portable terminal communication unit 16 of the image processing apparatus 100. At that time, the short range wireless communication unit 17 built in the portable terminal communication unit 16 and the short range wireless communication unit 29 included in the portable terminal device 200 completes processing of establishing connection therebetween. In the connection processing, the short range wireless communication unit 17 reads out the ID information from the short range wireless communication unit 29 and checks the ID information against the ID information of registration stored in the image processing apparatus 100 to automatically authenticate the portable terminal device 200. After the authentication processing is completed and the portable terminal device 200 is allowed to use the image processing apparatus 100, the link display application starts as described in FIG. 9B. When the checking of the ID information resulted in that the portable terminal device 200 is not registered in the image processing apparatus 100, the link display application does not start.

Figure 10:
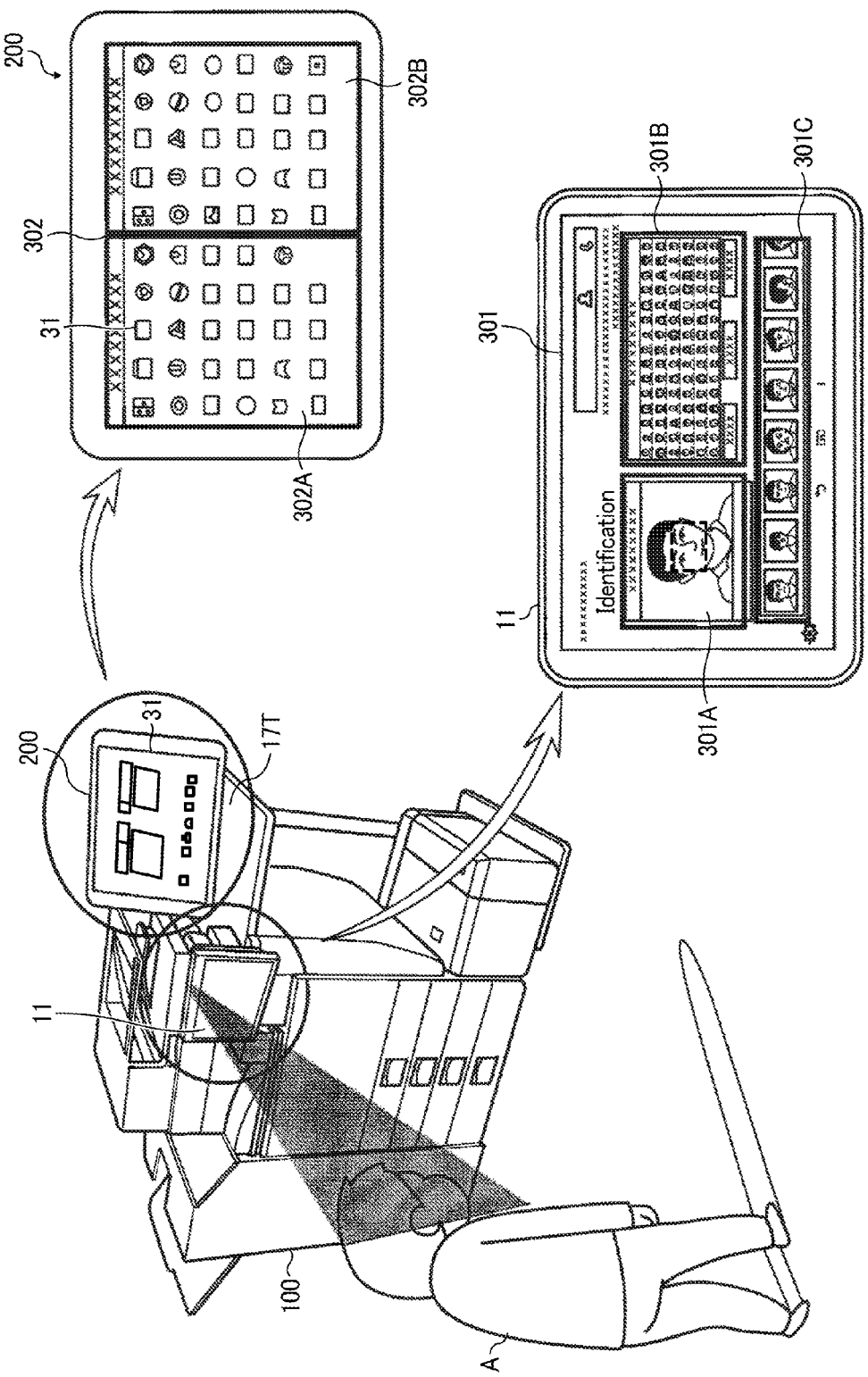
FIG. 10 is a perspective view of the image processing apparatus of FIG. 1 and front views illustrating a screen of a control panel of the image processing apparatus of FIG. 1 and a screen of a control panel of the portable terminal device of FIG. 2, when a user uses the image processing apparatus of FIG. 1 after the link operation system is established, which is after a state of FIG. 9.

FIG. 10 is a perspective view when a user A uses the image processing apparatus 100 of FIG. 1 and front views illustrating a screen 301 of the control panel 11 and a screen 302 of the control panel 31 in performing the link operation after the link operation system is established in FIG. 9. That is, FIG. 10 illustrates a subsequent operation of the link display system.

In FIG. 10, after the image processing apparatus 100 authenticates the portable terminal device 200 and the link display application is activated, the camera 45, such as a stereo camera, built in the control panel 11 captures a face image of the user using the image processing apparatus 100. By using face image data of the face image captured with the camera 45, the image processing apparatus 100 checks and authenticates the user. When the image processing apparatus 100 includes the proximity sensor 19 in the portable terminal communication unit 16, the camera 45 may be activated in response to a receipt of human information from the proximity sensor 19. When including the proximity sensor 19, the image processing apparatus 100 estimates and calculates a distance between a person being front of the image processing apparatus 100 and the image processing apparatus 100. Through this, the image processing apparatus 100 can determine whether distance is good enough to recognize facial features in capturing the face image with the camera 45.

The face image captured with the camera 45 is displayed on the display 12 of the control panel 11 as the screen 301. The image processing apparatus 100 extracts some of the facial features and digitalized the extracted features to generate digital data that is face feature data. The screen 301 includes (1) a first screen portion 301A to display the face image of the current user, which is captured with the camera 45, (2) a second screen portion 301B to display face images of registered users in a thumbnail format, (3) a third screen portion 301C to display the face image of the current user and some of the face images of registered users for checking.

The CPU 13 of the control panel 11 compares the face feature data of the current user with the data in the file of registered users stored in the memory 20 of the control panel 11 one by one to determine whether there is data that matches with the face feature data in the file. When there is data that matches with the face feature data in the file of the registered users, the authentication processing of the current user who is currently being front of the image processing apparatus 100 is completed, and the user is allowed to use the image processing apparatus 100. On the other hand, when there is no data that matches with the face feature data in the file of the registered users, the current user currently being front of the image processing apparatus 100 cannot use the image processing apparatus 100. Here, the authentication processing is performed in the control panel 11, however the embodiment is not limited to this. Instead of the CPU 13 of the control panel 11, the CPU 1 may perform the authenticating processing using the file of the registration stored in, for example, the storage device 5.

Figure 11:
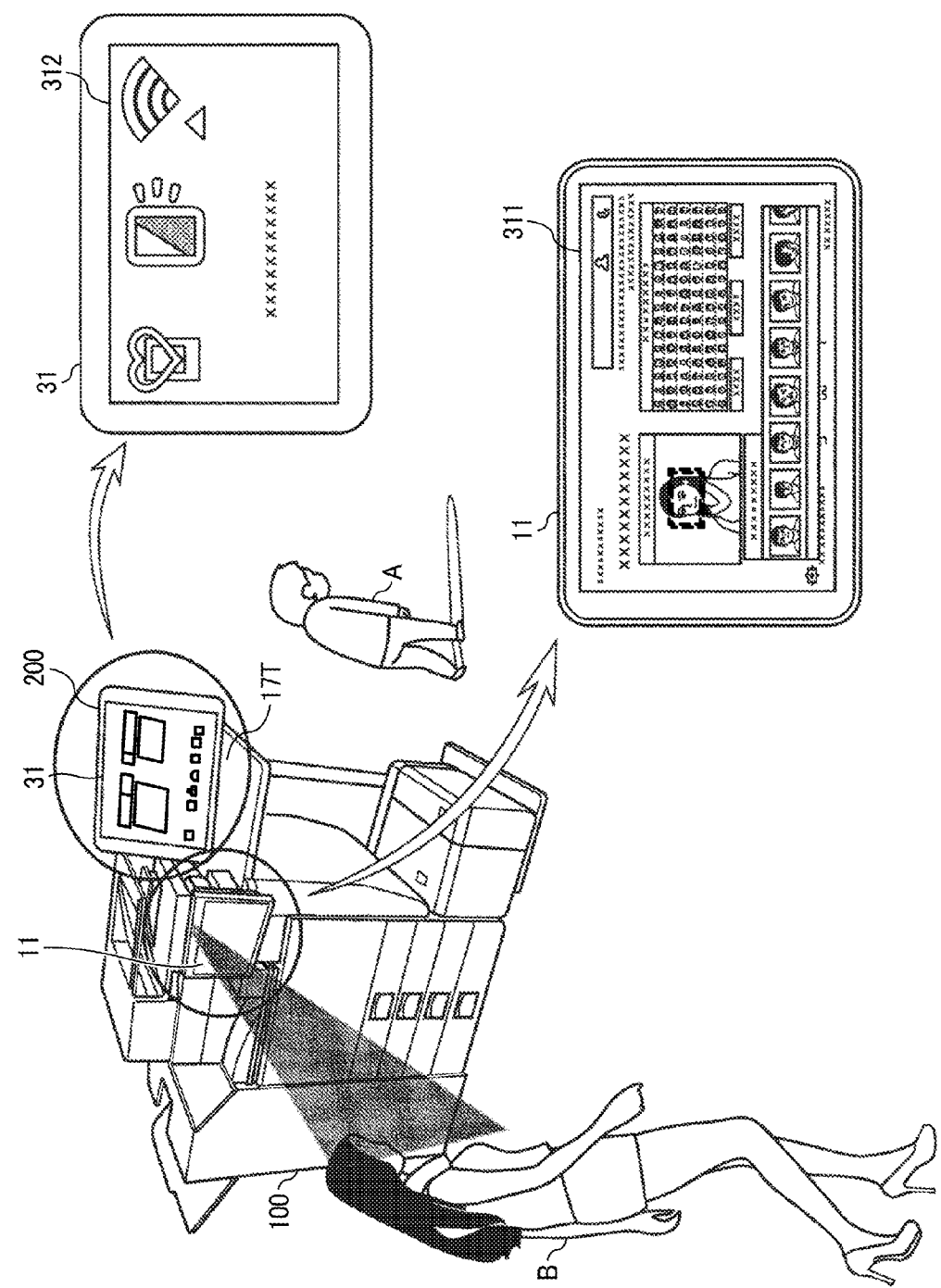
FIG. 11 is a perspective view of the image processing apparatus of FIG. 1 and front views illustrating another screen of the control panel of the image processing apparatus of FIG. 1 and another screen of the control panel of the portable terminal device of FIG. 2, when another user uses the image processing apparatus of FIG. 1 after the user of FIG. 10 uses.

When the authentication processing is completed and the user is allowed to use the image processing apparatus 100, the screen 302 of the portable terminal device 200 displays the menu screen of the link display system as described in FIG. 10. The screen 302 has a first screen portion 302A displayed at left and including icons of the link display menu that is displayed on the control panel 11 of the image processing apparatus 100 and a second screen portion 302B displayed at right and including icons of the link display menu that is displayed on the control panel 31 of the portable terminal device 200. FIG. 11 is a view having front views illustrating a screen 311 of the control panel 11 and a screen 312 of the control panel 31 in performing the link operation, in which a user B uses the image processing apparatus after the user A. That is, FIG. 11 illustrates a subsequent operation of the link display system from FIG. 10.

When there is no input operation for a certain period after the user A finishes a sequence of operations, the camera 45 and the proximity sensor 19 are again activated and detect a presence or absence of a human body around the image processing apparatus 100 and obtain human information for a certain period. At this time the screen 312 may display a standby screen as described in FIG. 11. When detecting no human body, namely obtaining no human information, the image processing apparatus 100 transitions to the power saving mode, in order to reduce power consumption. On the other hand, when detecting a human body, namely obtaining the human information, the image processing apparatus 100 extracts a plurality of facial features from the face image captured with the camera 45 and digitalizes the extracted facial features to the face feature data.

The face feature data, which is currently digitalized, is compared with the face feature data of the user A. If the current user is the user A as a result of the comparison of the face feature data, namely the currently digitalized face feature data matches with the face feature data of the user A, the image processing apparatus 100 displays, on the control panel 11, a screen that is used by the user A last time, in stead of the screen for the authentication processing. At that time, the image processing apparatus 100 does not perform the user authentication processing, because the user authentication processing for the user A has already performed, as described above with reference to FIG. 10. Alternatively, the image processing apparatus 100 may display, on the control panel 11, the initial menu screen of the link display system with the icons (screen 302 of FIG. 10) again, instead of the screen that the user A used last time. When the current user is not the user A, but the user B, the image processing apparatus 100 compares the face feature data of the current user (user B) with the data in the file of registered users stored in the memory 20 or the storage device 5 of the image processing apparatus 100 one by one to determine whether there is data that matches with the face feature data of the user B in the file. This process is the same process as the one described with reference to FIG. 10. At this time, the display 12 of the control panel 11 displays the face image captured with the camera 45 as described with the screen 311. A subsequent process is the same as the process described above.

Examples of screens displayed in the link display system with the image processing apparatus 100 will be described with reference to FIG. 12A to FIG. 15.

Figure 12A:
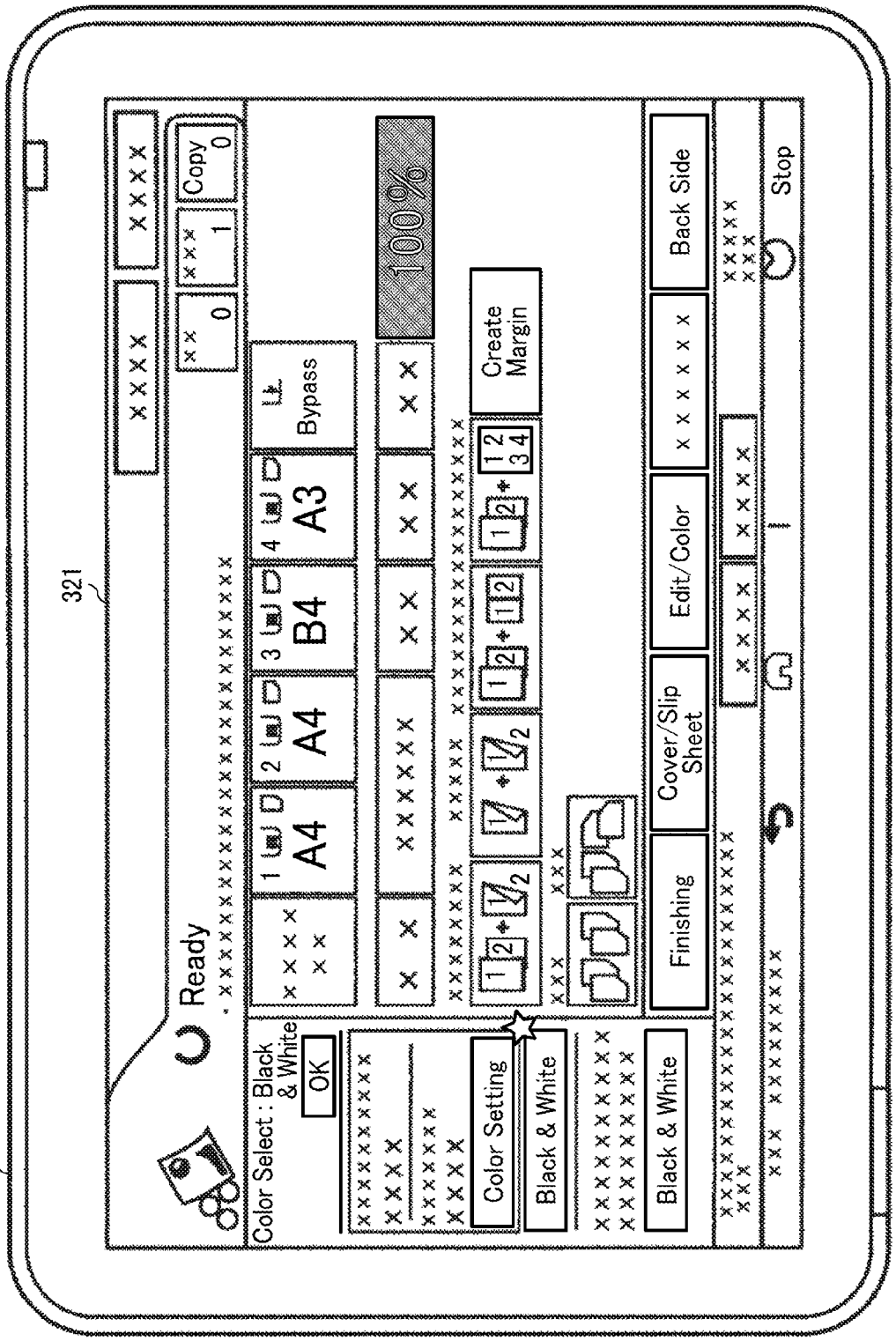
FIG. 12A is a front view illustrating a screen of the control panel of the image processing apparatus of FIG. 1 performing a copy application function.

FIG. 12A is a front view illustrating a screen 321 of the control panel 11 of the image processing apparatus 100 of FIG. 1 performing a copy application function. FIG. 12B is a front view illustrating the screen 322 of the control panel 31 when the copy application function is performed by the image processing apparatus of FIG. 1. FIG. 12A and FIG. 12B are views each illustrating an example of a screen associated with the copier application function. The display 32 of the control panel 31 of the portable terminal device 200 displays the screen 322 which is an operation screen (FIG. 12B) customized by the user who is authenticated. The display 12 of the control panel 11 of the image processing apparatus 100 displays the screen 321 which is a common operation screen for copy (FIG. 12A).

Figure 13B:
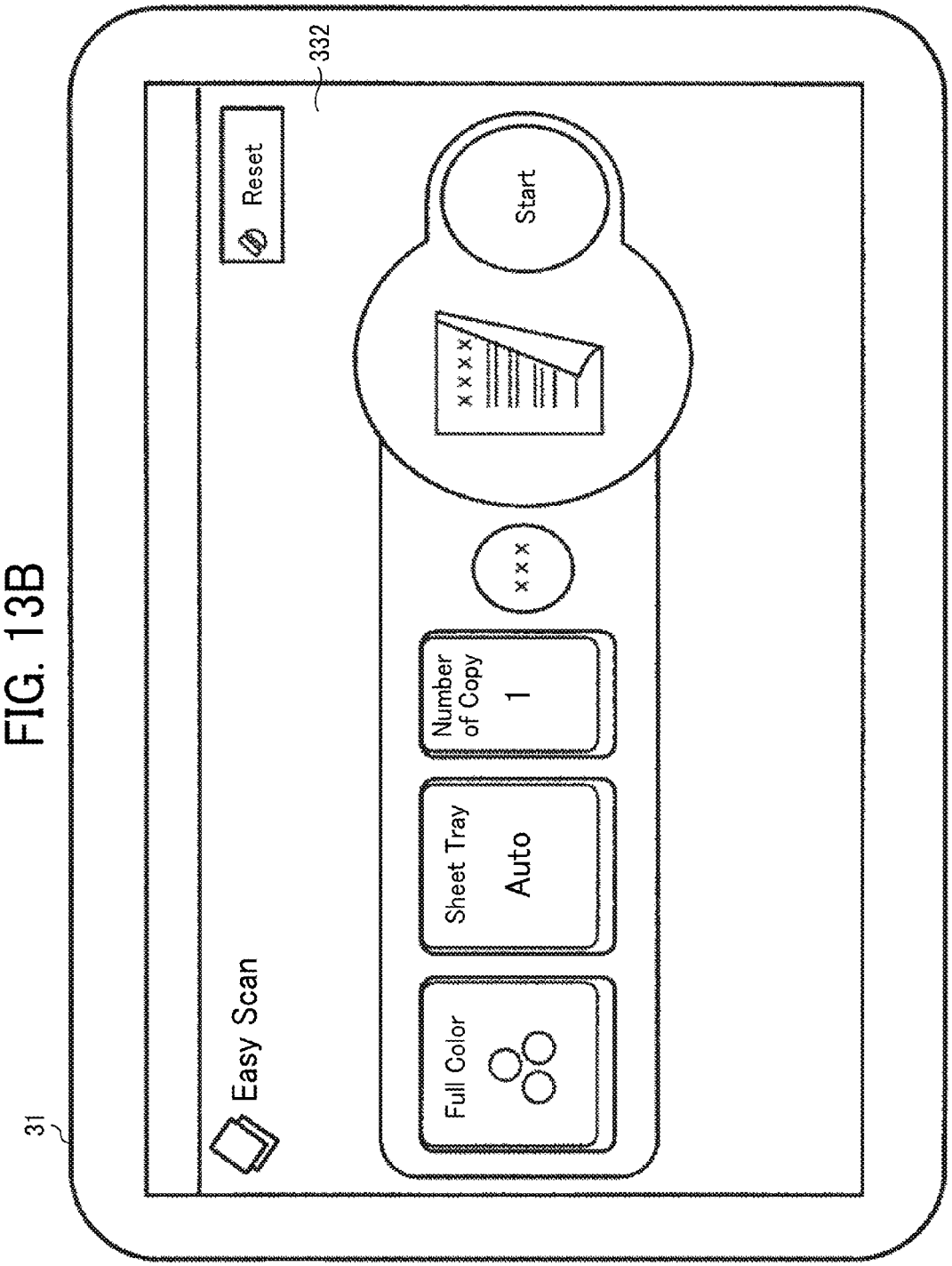
FIG. 13B is a front view illustrating a screen of the control panel of the portable terminal device of FIG. 2 when the scanner application function is performed by the image processing apparatus of FIG. 1.

FIG. 13A is a front view illustrating a screen 331 of the control panel 11 of the image processing apparatus 100 of FIG. 1 performing a scanner application function. FIG. 13B is a front view illustrating a screen 332 of the control panel 31 when the scanner application function is performed by the image processing apparatus of FIG. 1. FIG. 13A and FIG. 13B are views each illustrating an example of a screen associated with the scanner application function. The display 32 of the control panel 31 of the portable terminal device 200 displays the screen 332 which is an operation screen (FIG. 13B) customized by the user who is authenticated. Additionally, the display 12 of the control panel 11 of the image processing apparatus 100 displays the screen 331 which is a menu screen (FIG. 12A) of a browser or cloud solution application in association with a scanner application.

FIG. 14A is a front view illustrating a screen 341 of the control panel 11 of the image processing apparatus 100 of FIG. 1 performing a printer application function. FIG. 14B is a front view illustrating a screen 342 of the control panel 31 when the printer application function is performed by the image processing apparatus 100 of FIG. 1. FIG. 14A and FIG. 14B are views each illustrating an example of a screen associated with the printer application function. The display 32 of the control panel 31 of the portable terminal device 200 displays the screen 342 which is an operation screen (FIG. 14B) customized by the user who is authenticated. Additionally, the display 12 of the control panel 11 of the image processing apparatus 100 displays the screen 341 (FIG. 14A) that displays information indicating a place (tray) where a recording medium is ejected and status information.

Figure 15B:
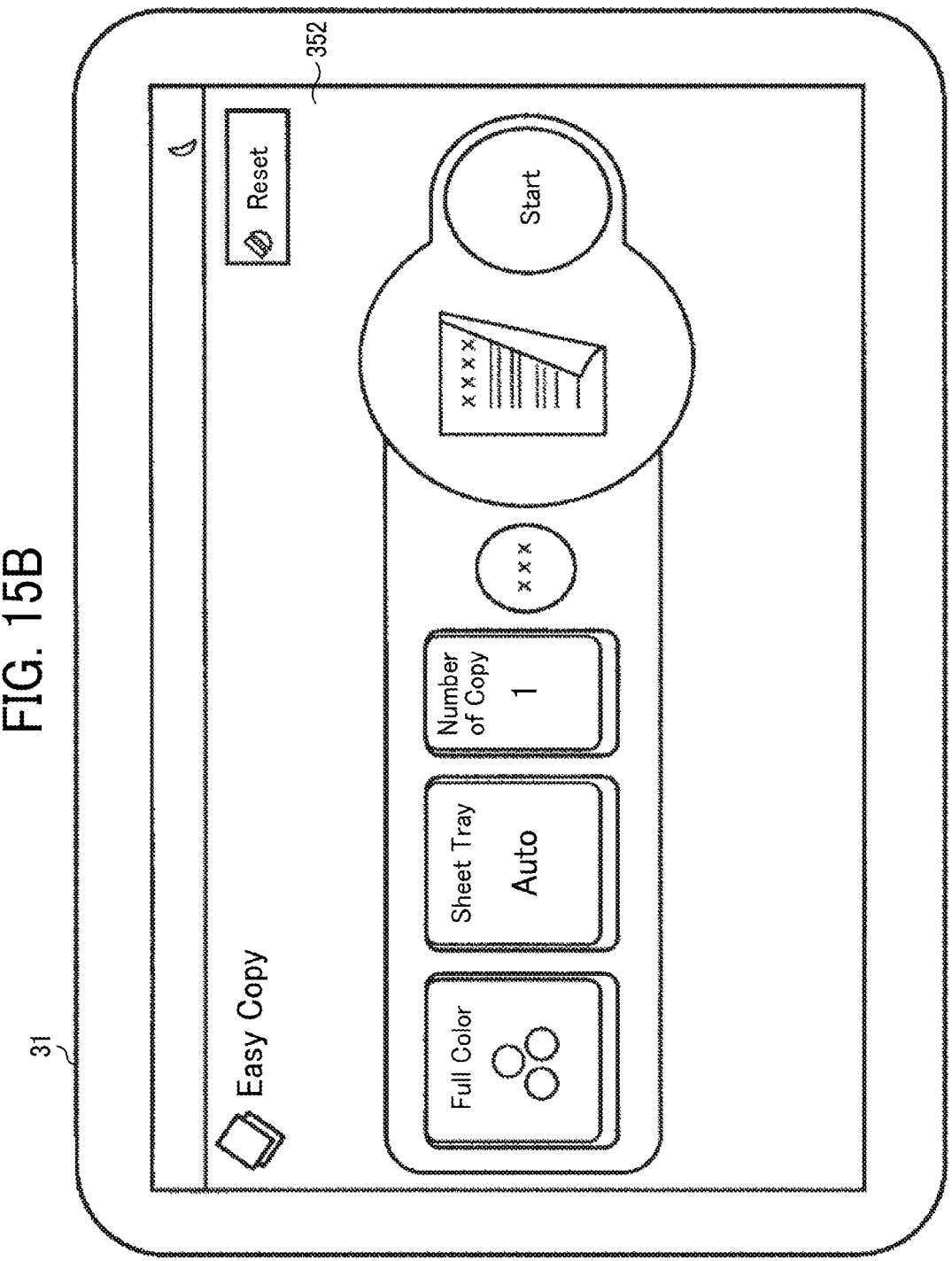
FIG. 15B is a front view illustrating a screen of the control panel of the portable terminal device of FIG. 2 when the user authentication function is performed by the image processing apparatus of FIG. 1.

FIG. 15A is a front view illustrating a screen 351 of the control panel 11 of the image processing apparatus 100 of FIG. 1 performing the user authentication function. FIG. 15B is a front view illustrating a screen 352 of the control panel 31 when the user authentication function is performed by the image processing apparatus 100. FIG. 15A and FIG. 15B are views each illustrating an example of a screen at the time of performing the user authentication processing. The display 32 of the control panel 31 of the portable terminal device 200 displays the screen 352 which is an operation screen (FIG. 15B) customized by the user who is authenticated. The display 12 of the control panel 11 of the image processing apparatus 100 displays a screen 351 (FIG. 15A) that indicates a status in performing face authentication processing.

Here, the screens 322, 332, 342, and 352 of the portable terminal device 200 may be caused not to be displayed until the user authentication processing of the image processing apparatus 100 is completed, or a common operation screen may be temporarily displayed instead of the screens 322, 332, 342, and 352. When the user is authenticated, the screen customized for the user is displayed. The operations of the touch panel 14 and touch panel 34 may be masked until the user authentication processing is completed, to completely avoid fraudulent operation.

As described above, the link display system of the image processing apparatus 100 and the portable terminal device 200 according to the embodiment performs the authentication processing to authenticate both of the portable terminal device 200 and the user, and providing a strict security function, accordingly. Additionally, in the link display system of the image processing apparatus 100 and the portable terminal device 200 according to the embodiment, both of a situation that the portable terminal device 200 is belonging to a single user and a situation that the portable terminal device 200 is shared by a plurality of users are assumed. That is, it is assumed that there is a situation that one of the plurality of users leaves the image processing apparatus 100 without taking the portable terminal device 200 with the user after the user finishes a series of operation, when the portable terminal device 200 is shared by the plurality of users.

Additionally, the portable terminal device 200 and the image processing apparatus 100 can selectively switch a power mode between a normal power mode (hereinafter, referred to as a normal mode) and the power saving mode in which a power consumption is smaller than that of the normal mode. Each of the portable terminal device 200 and the image processing apparatus 100 usually operates in the normal mode. When each of the portable terminal device 200 and the image processing apparatus 100 does not accepts any operations nor performs any jobs, in other words, is in a standby state, for a certain period, the status is determined as out of use and the power mode is switched from the normal mode to the power saving mode.

Additionally, the display 12 of the portable terminal device 200 and the display 32 of the image processing apparatus 100 do not display anything, when operating in the power saving mode. The link display system is an application that is activated after the connection between the image processing apparatus 100 and the portable terminal device 200 is established via the short range wireless communication units 17 and 29 and then the user authentication processing to authorize a user to use the image processing apparatus 100 is completed. With the link display system, a display mode of each of the image processing apparatus 100 and the portable terminal device 200 is switched to a link display mode in which a screen of one of the image processing apparatus 100 and the portable terminal device 200 is changed according to a change of a screen of the other one of the image processing apparatus 100 and the portable terminal device 200.

In the embodiment described above, the image processing apparatus 100 displays a screen for the face authentication first, and the portable terminal device 200 displays a menu screen, which is for selecting a type of screen displayed after a completion of the face authentication, when the image processing apparatus 100 and the portable terminal device 200 perform the link display application in the link display mode. Here, during performing the link display application in the link display mode with the link display system according to the first example of the embodiment, both of the image processing apparatus 100 and the portable terminal device 200 do not transition to the power saving mode as long as any one of the image processing apparatus 100 and the portable terminal device 200 is in use. This prevents a situation that one of the image processing apparatus 100 and the portable terminal device 200 transitions to the power saving mode, when, for example, only the other one of the image processing apparatus 100 and the portable terminal device 200 is in use.

In the embodiment described above, the image processing apparatus 100 displays a predetermined setting screen and the portable terminal device 200 displays the operation and screen according to the predetermined setting screen during executing the link display application, however other screens may be displayed. For example, the image processing apparatus 100 may display a part of one large screen and the portable terminal device 200 may display other part of the one large screen continuous to the part displayed with the image processing apparatus 100. In this situation, when one of the image processing apparatus 100 and the portable terminal device 200 accepts operation of scrolling the screen, the other one of the image processing apparatus and the portable terminal device 200 also scrolls the screen according to the other scroll of the other screen.

Here, displaying a screen for setting contents of printer settings on the display 32 of the portable terminal device 200 and sending and reflecting the contents of the printer settings set with the portable terminal device 200 to the image processing apparatus 100 is just a remote-control operation, so that such a operation is not included in the link display application. The link display system is defined as a system in which one of screens is switched in conjunction with switch of the other one of screens, namely contents of the both displays are linked with each other. Additionally, to activate the link display system, the link display application is required to be executed before the activation.

The above-described embodiment may be performed in various other ways, for example, as described below referring to FIGS. 16 to 21.

FIG. 16 is a flowchart illustrating an exemplary process performed by the image processing apparatus 100 in a second example. The process illustrated in FIG. 16 is different from the process illustrated in FIG. 3 in that S117 and S118 are added between S111 and S112. Detail of the difference will be described below.

In FIG. 16, when the portable terminal device 200 is not in use, namely the determination at S111 is NO, the image processing apparatus 100 determines that the user finishes using for that time, and ends the link display application (S117). At that time, the image processing apparatus 100 stores, in the user log 4A, which is a storage area in the NVRAM 4, log information including, for example, user information, device information, date information, application information, use duration information, and connected terminal device information which are generated from S105 to S117 as history data.

According to the second example of the embodiment as described above, the image processing apparatus 100 can register the log information including, for example, user information, date information, application information, use duration information, and device information.

In the second example of the embodiment, the user log 4A is stored in the NVRAM 4 for not effecting productivity of the image processing apparatus 100, however, the disclosure is not limited to this and the storage device 5 may store the user log 4A according to a configuration of the image processing apparatus 100.

Figure 17B:
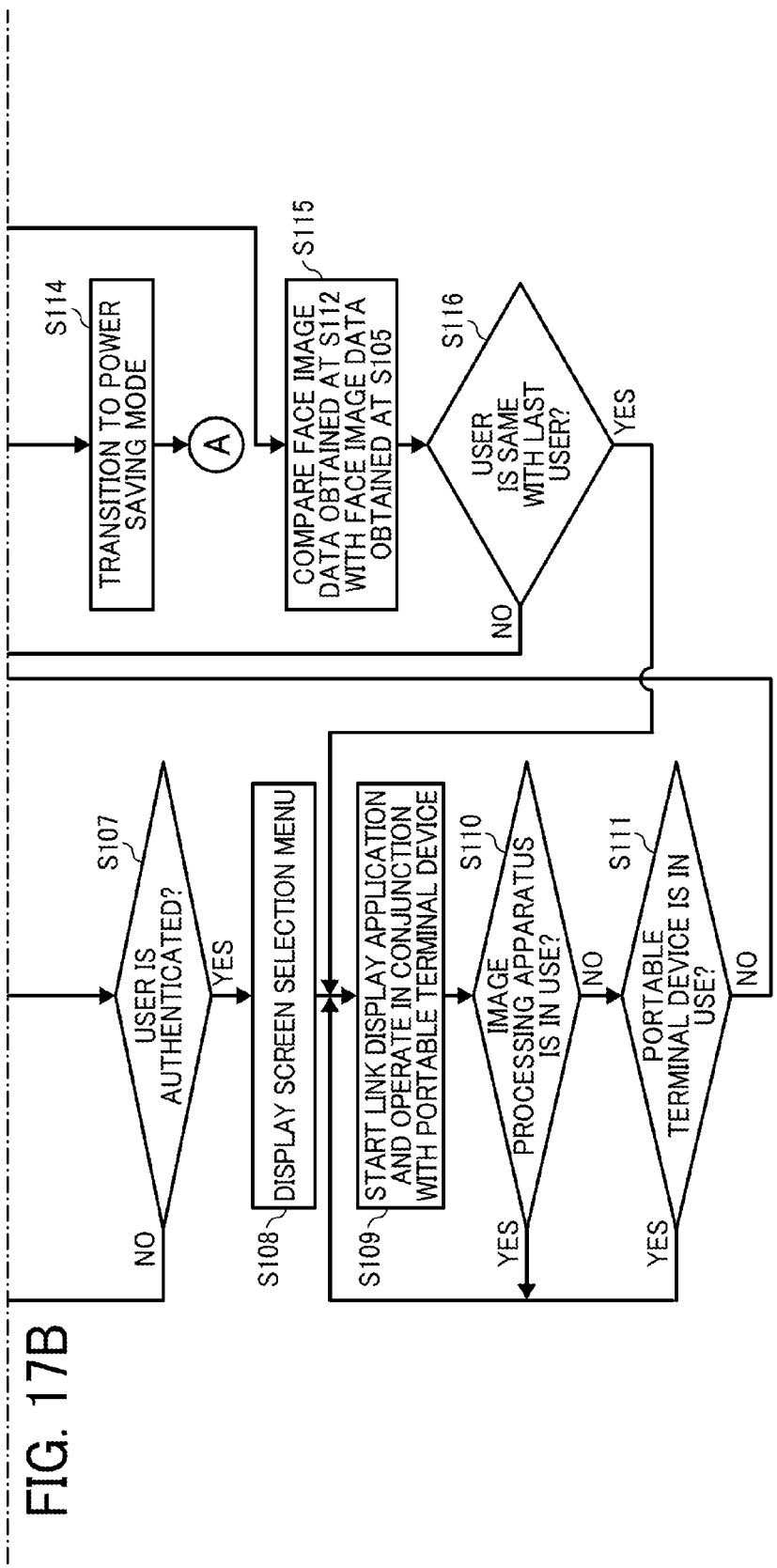

FIG. 17 (FIGS. 17A and 17B) is a flowchart illustrating a process performed by the image processing apparatus 100 according to a third example of the embodiment. The process illustrated in FIG. 17 is different from the process illustrated in FIG. 16 in that S120 to S121 are added between S117 and S118. Detail of the difference will be described below.

At S117 in FIG. 17, when ending the link display application, the image processing apparatus 100 checks a free space assigned for registering the user log 4A in memory area of the NVRAM 4 in advance (S119). When the memory has an enough space (YES at S120), the process continues to S118, and the user log information is stored in the user log 4A in the NVRAM 4. On the other hand, the memory does not have an enough space (NO at S120), the oldest user log data is automatically deleted. The oldest user log data is determined by checking used dates of all of the user log data previously registered to the user log 4A in the NVRAM 4. Through this, the user log 4A obtains a free space required to store a new user log and the process continues to S118.

According to the third example of the embodiment as described above, the newest user log can be maintained by deleting the oldest log among all of the log information previously registered, even when there is no free space in the user log 4A.

Figure 18B:
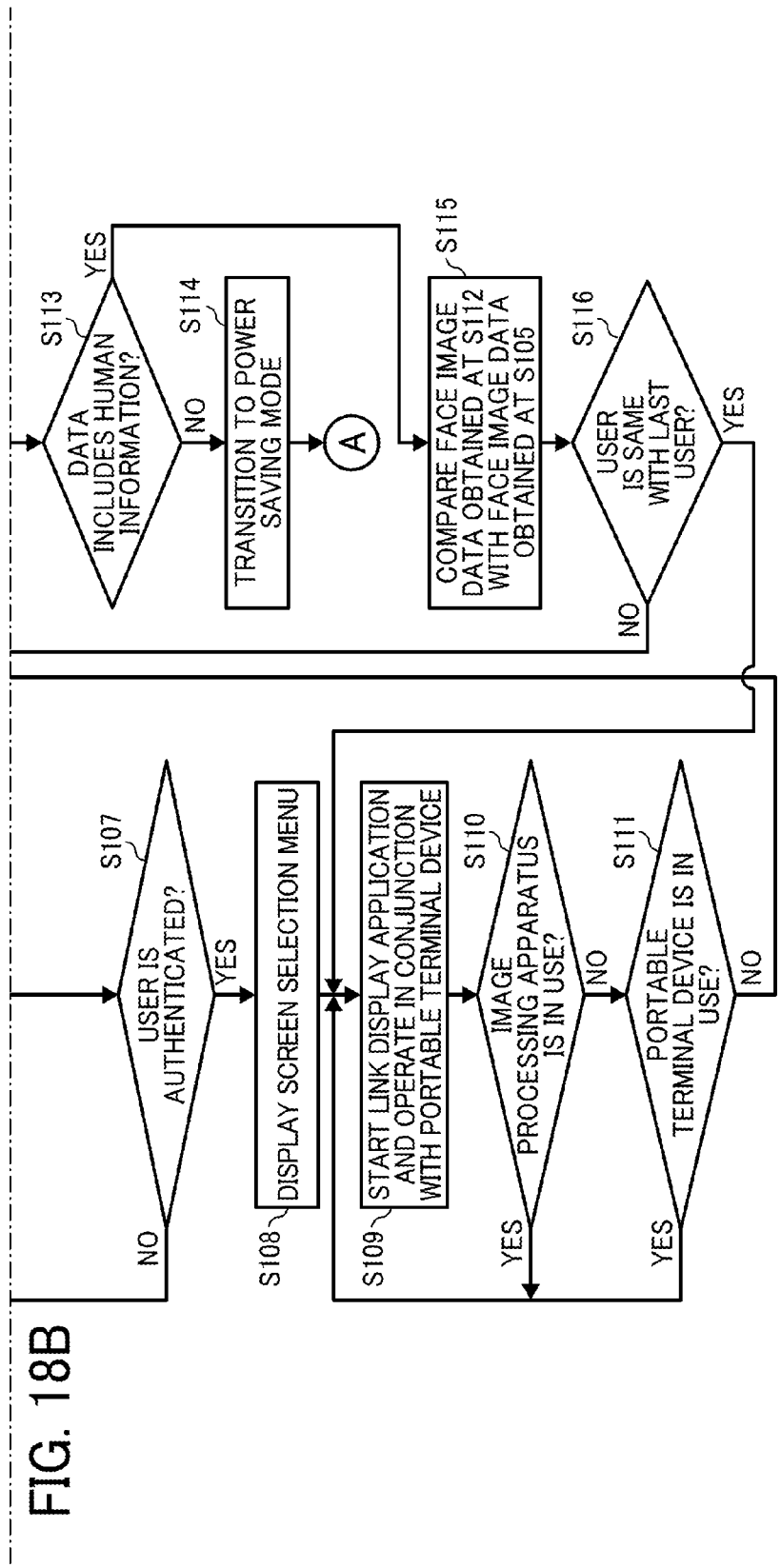

FIG. 18 (FIGS. 18A and 18B) is a flowchart illustrating a process performed by the image processing apparatus 100 according to a fourth example of the embodiment. The process illustrated in FIG. 18 is different from the process illustrated in FIG. 17 in that S122 and S123 are added by replacing with S121. Detail of the difference will be described below.

When the memory does not have an enough space (NO at S120), as a result of checking the free space at S119 of FIG. 18, a list of all of the user log data previously registered in the user log 4A of the NVRAM 4 is read from the user log 4A. The display 12 displays a thumbnail of the list of the read data in a list format (S122). Subsequently, the user selects and/or deletes any log from the displayed list of the user log, and thus the user log 4A enables to have a space required to store the new user log. The process continues to S118.

Figure 19B:
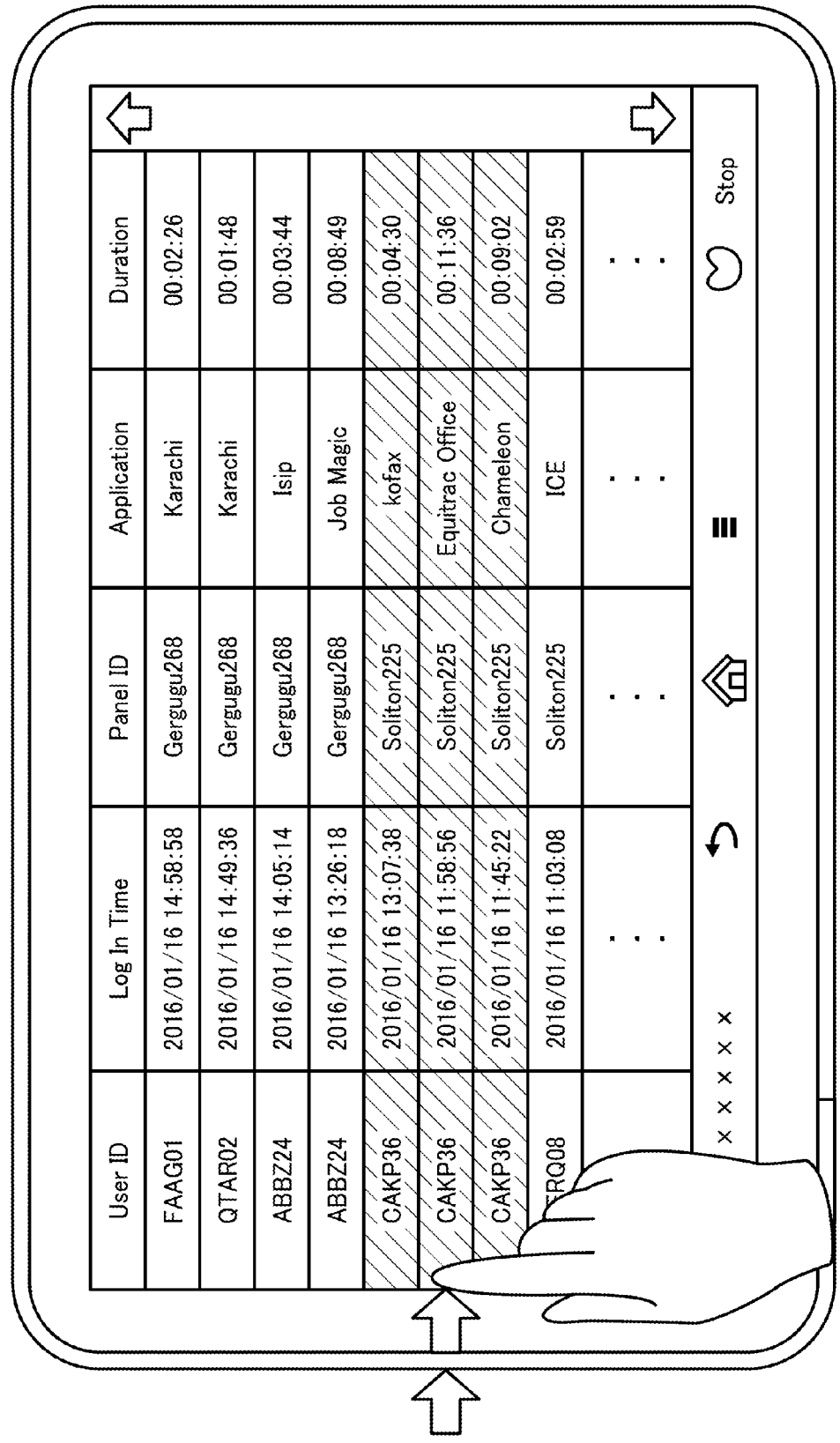
FIG. 19B is a front view illustrating a screen related to a second exemplary operation in the process illustrated in FIG. 18, which is performed by the image processing apparatus of FIG. 1.

FIG. 19A is a front view illustrating a screen of a first exemplary operation of S123 in the process of FIG. 18 performed by the image processing apparatus 100. FIG. 19B is a front view illustrating a screen of a second exemplary operation of S123 in the process of FIG. 18 performed by the image processing apparatus 100. Additionally, FIG. 19C is a front view illustrating a screen of a second exemplary operation of S123 in the process of FIG. 18 performed by the image processing apparatus 100.

Figure 19C:
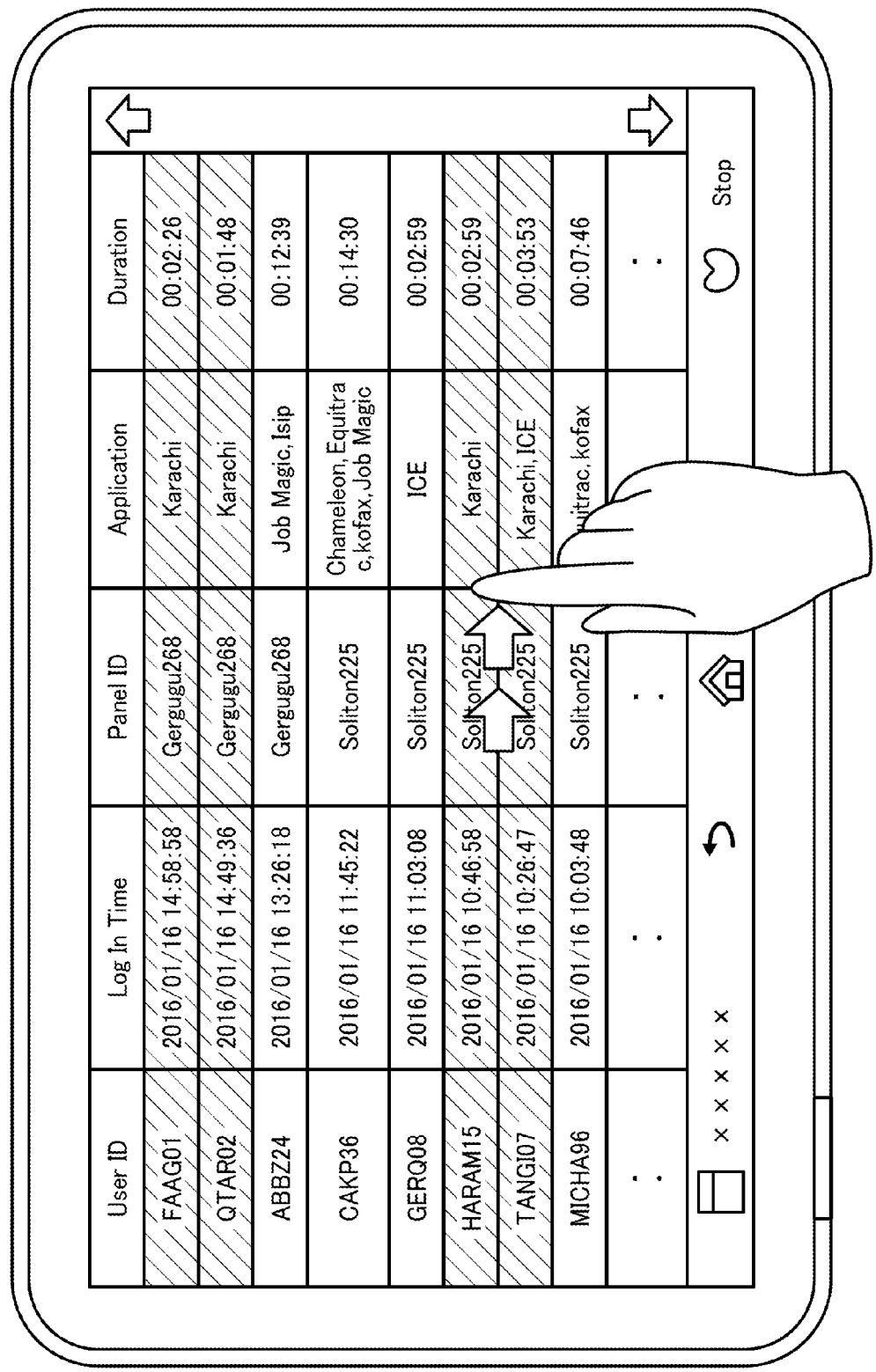
FIG. 19C is a front view illustrating a screen related to a third exemplary operation in the process illustrated in FIG. 18, which is performed by the image processing apparatus of FIG. 1.

As described with FIGS. 19A to 19C, items of information including, for example, user ID, log-in date and time, display terminal ID, used application, use duration is displayed in chronological order in a list format. Each items are associated with each other to constitute a set of log information. The following describes three exemplary manners of selecting any logs from the list of the user log.

(1) Example of FIG. 19A: Selecting one set of user log information by selecting log-in date and time.

(2) Example of FIG. 19B: Selecting all sets of user log information that is associated with a user by selecting a user ID.

(3) Example of FIG. 19C: Selecting all sets of user log information that is associated with an application by selecting the application.

According to the fourth example of the embodiment as described above, a user can check the user log information to select arbitrarily to delete the unwanted user log information and keep the wanted user log information.

Figure 20B:
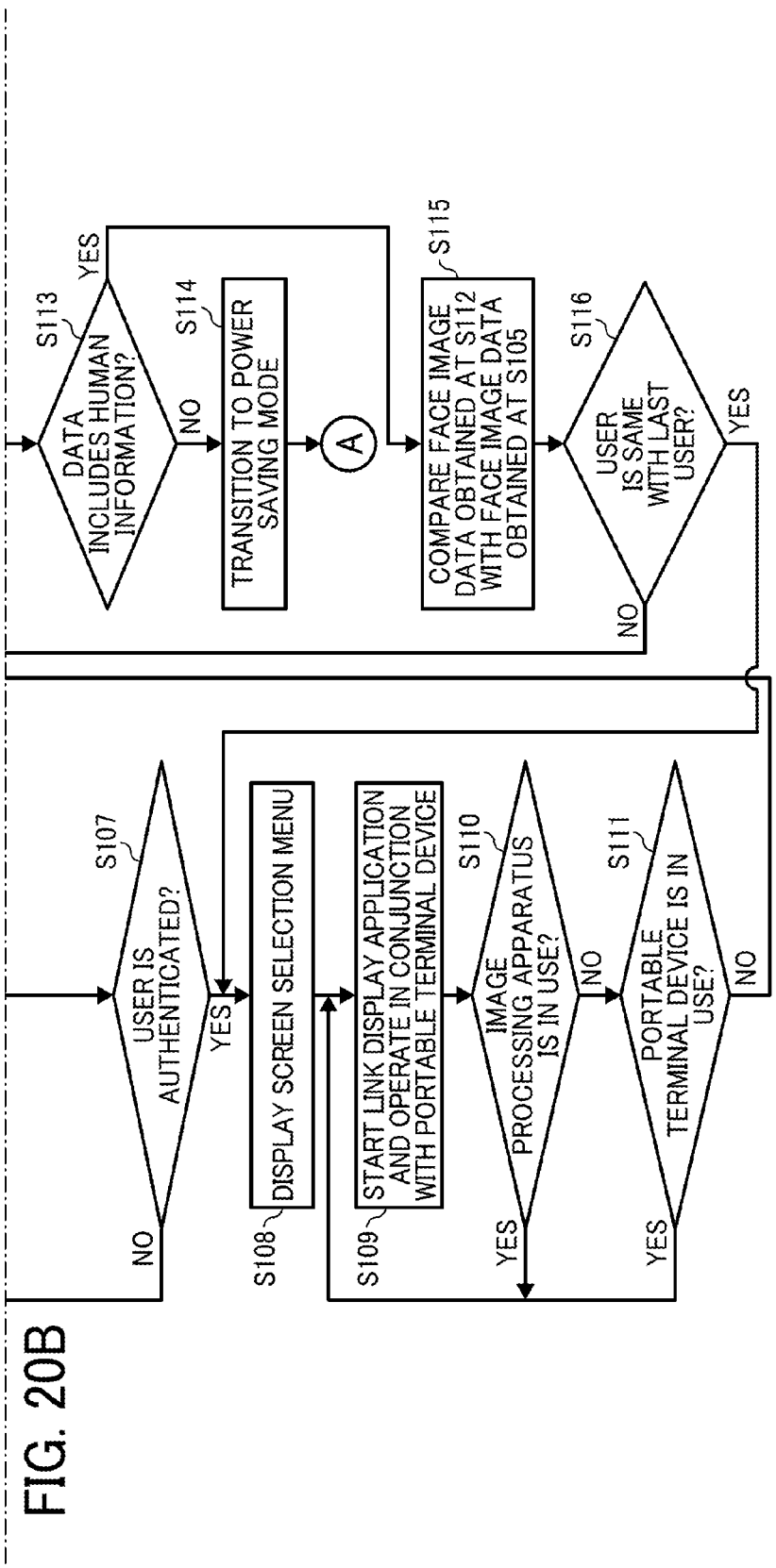

FIG. 20 (20A and 20B) is a flowchart illustrating a process performed by the image processing apparatus 100 according to a fifth example of the embodiment. The process illustrated in FIG. 20 is different from the process illustrated in FIG. 18 in that S124 and S125 are added by replacing with S122 and S123. Detail of the difference will be described below.

When the memory does not have an enough space (NO at S120) as a result of checking the free space at S119 of FIG. 20, a list of all of the user log data previously registered in the user log 4A of the NVRAM 4 is read from the user log 4A. The read data is transferred to, for example, the management server or the cloud server via the network interface 10 (S124). After transferring all of the user log data, the user log data in the user log 4A of the NVRAM 4 is cleared (deleted) to generate an enough space for storing the new user log (S125).

According to the fifth example of the embodiment as described above, all of the user log data can be backed up by reading the all of the user log data from the user log 4A and automatically transferring the read data to, for example, the management server of the cloud server.

In the fifth example of the embodiment described above, only when the user log 4A of the NVRAM 4 does not have an enough space, the image processing apparatus 100 collectively transfers all of the user log data accumulated to the user log 4A to the management server or the cloud server. However, the disclosure is not limited to this and the image processing apparatus 100 may transfer the user log data to the management server or the cloud server each time a user uses image processing apparatus 100, or for each certain period. The process of the FIG. 20 is applied when the image processing apparatus 100 does not include storage device 5.

Figure 21B:
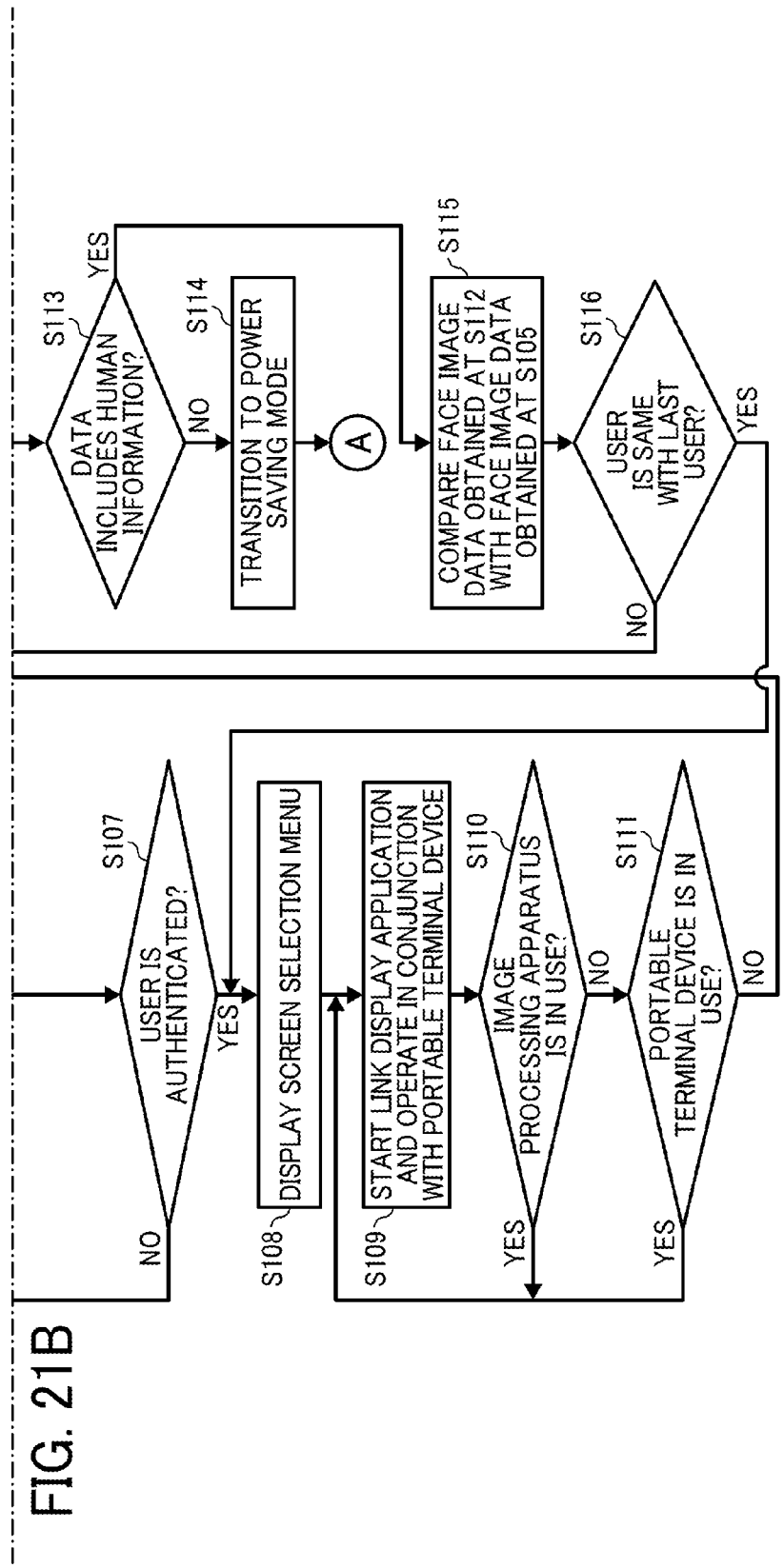

FIG. 21 (FIGS. 21A and 21B) is a flowchart illustrating a process performed by the image processing apparatus 100 according to a sixth example of the embodiment. The process illustrated in FIG. 21, is different from the process illustrated in FIG. 20 in that S124A is added by replacing with S124. Detail of the difference will be described below.

When the memory does not have an enough space (NO at S120), as a result of checking the free space at S119 of FIG. 21, a list of all of the user log data previously registered in the user log 4A of the NVRAM 4 is read from the user log 4A. The storage device 5 stores the read data as back up data (S124A). Subsequently, when completing back up processing to store all of the user log data, the user log data in the user log 4A of the NVRAM 4 is cleared (deleted) to have enough space for storing the new user log (S125).

According to the sixth example of the embodiment as described above, all of the user log data can be backed up by reading all of the user log data from the user log 4A and automatically transferring the read data to the storage device 5.

In the sixth example of the embodiment described above, only when the user log 4A of the NVRAM 4 does not have the enough space, the image processing apparatus 100 collectively transfers all of the user log data accumulated to the user log 4A to the storage device 5. However, the disclosure is not limited to this and the image processing apparatus 100 may transfer the user log data to the storage device 5 each time a user uses image processing apparatus 100, or each certain period. The process of the FIG. 21 is applied to the image processing apparatus 100 that includes the storage device 5.

Although the exemplary embodiments of the invention have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

For example, any one of the above-described operations to be performed by any one of the CPUs may be performed by a single CPU, or distributed over more than one CPU that may reside in the image processing apparatus or over the network.

What is claimed is:

1. An image processing apparatus comprising:
circuitry to authenticate a first user;
a display of the image processing apparatus to display an initial screen to the first user, after the first user is authenticated; and
a communication device to wirelessly communicate with a portable terminal device operated by the first user to control a display of the portable terminal device to display and additional initial screen based on display contents of the initial screen;
the circuitry further configured to determine whether at least one of the image processing apparatus and the portable terminal device is not in use, and
based on a determination indicating that the at least on of the image processing apparatus and the portable terminal device is not in use, the circuitry is further configured to:
determine whether any user is present at the image processing apparatus, using a detector that detects human presence at the image processing apparatus to generate a first determination result,
wherein, when the first determination result indicates that no human is present, the circuitry causes the image processing apparatus to transition from a normal operating mode to a power saving mode, and
wherein, when the first determination result indicates that human is present, the circuitry is further configured to:
obtain user identification information identifying a second user who is determined as present from the detector;
determine if the second user is same as the first user who has operated at least one of the image processing apparatus and the portable terminal device to generate a second determination result, based on a match between the user identification information of the second user and user identification information of the first user that is previously stored in a memory;
when the second determination result indicates that the user identification information of the second user matches the user identification information of the first user, allows a display of the initial screen and the additional initial screen respectively on the display of the image processing apparatus and the display of the portable terminal device, without requiring authentication of the second user; and when the second determination result, indicates that the user identification information of the second user does not match the user identification information of the first user, causes the display of the image processing apparatus to display the initial screen at second user, after the second user is unauthenticated.

2. The image processing apparatus of claim 1, wherein the circuitry is further configured to, receive, from the portable terminal device, terminal identification information identifying the portable terminal device operated by the first user, when the portable terminal device is detected;

authenticate the portable terminal device based on a match between the received terminal identification information and registered terminal identification information; and control the display of the portable terminal device that is authenticated to display the additional initial screen.

3. The image processing apparatus or claim 1, wherein, when the determination indicates that the user identification information of the second user matches the user identification information of the first user, the circuitry causes the display of the image processing apparatus to display a screen that is displayed last time by the first user, in place of the initial screen.

4. The image processing apparatus of claim 1, wherein, when the determination indicates that the user identification information of the second user matches the user identification information of the first user, the circuitry further causes, the display of the image processing apparatus to, display a selection screen that allows the first user to select one of a last screen that is displayed last time by the first user and the initial screen, and display a selected one of the last screen and the initial screen.

5. The image processing apparatus of claim 1, wherein the circuitry performs a link operation to cause the display of the image processing apparatus to change a screen according to a change of a screen of the portable terminal device, when the portable terminal device is mounted on the image processing apparatus, and wherein the circuitry stops the link operation and causes the display of the image processing apparatus to display the initial screen when the circuit detects separation of the portable terminal device from the image processing apparatus.

6. The image processing apparatus of claim 5, wherein the circuitry stops supplying power to the portable to device when the circuitry detects the separation of the portable terminal device from the image processing apparatus.

7. The image processing apparatus of claim 6, further comprising a memory, and wherein the circuitry stones in the to memory data that is obtained through performing the link operation.

8. The image processing apparatus of claim 7, wherein the circuitry stores the data that is obtained through performing the link operation when the circuitry detects the separation of the portable terminal device.

9. An electronic apparatus comprising, the image processing apparatus of claim 1.

10. A link display system comprising, the image processing apparatus of claim 1; and the portable terminal device including:

a communication device to wirelessly communicate with the image processing apparatus; and, the display of the portable terminal device to display a screen based on display contents of a screen of the display of the image processing apparatus.

11. A method of controlling an image processing apparatus, the method comprising:

authenticating a first user;

displaying, on a display of the image processing apparatus, an initial screen to the first user after the first user is authenticated;

controlling a display of a portable terminal device operated by the first user to display an additional initial screen based on display contents of the initial screen;

determining whether at least on of the image processing apparatus and the portable terminal device is not in use; and based on a determination indicating that the at least one of the image processing apparatus and the portable terminal device is not in use, determining whether any user is present at the image processing apparatus, using a detector that detects human presence at the image processing apparatus to generate a first determination result, wherein, when the first determination result indicates that no human is present, the method further comprising controlling the image processing apparatus to transition from to normal operating mode to a power saving mode, and wherein, when the first determination result indicates that human is present, the method further comprising:

controlling the detector to obtain user identification information identifying a second user who is determined as present;

determining if the second user is same as the first user who has a operated at least one of the image processing apparatus and the portable terminal device to generate a second determination result, based on a match between the user identification information of the second user and user identification information of the first user that is previously stored in a memory;

when the second determination result indicates that the user identification information of the second user matches the user identification information of the first user, allowing a display of the initial screen and the additional initial screen respectively on the display of the image processing apparatus and the display of the portable terminal device, without requiring authentication of the second user; and when the second determination result indicates that the user identification information of the second user does not match the user identification information of the first user, causing the display of the image processing apparatus to display the initial screen to the second user, after the second user is authenticated.

12. A non-transitory recording medium storing a plurality of instructions which, when executed by one or more processors, cause the processors to perform a method of controlling an image processing apparatus, the method comprising:

authenticating a first user;

displaying, on a display of the image processing apparatus, an initial screen to the first user after the first user is authenticated;

controlling a display of a portable terminal device operated by the first user to display an additional initial screen based on display contents of the initial screen;

determining whether at least one of the image processing apparatus and the portable terminal device is not in use; and based on a determination indicating that the at least One of the image processing apparatus and the portable terminal device is not in use, determining whether any user is present at the image processing apparatus, using a detector that detects human presence at the image processing apparatus to generate a first determination result, wherein, when the first determination result indicates that no human is present, the method further comprising controlling the image processing apparatus to transition from a normal operating mode to a power saving mode, and wherein, when the first determination result indicates that human is present, the method further comprising:

controlling the detector to obtain user identification information identifying a second user who is determined as present;

determining if the second user is same as the first user who has operated at least one of the image processing apparatus and the portable terminal device to generate a second determination result, based on a match between the user identification information of the second user and user identification information of the first user that is previously stored in a memory;

when the second determination result indicates that the user identification information of the second user matches the user identification information of the first user, allowing a display of the initial screen and the additional initial screen respectively on the display of the image processing apparatus and the display of the portable terminal device, without requiring authentication of the second user; and when the second determination result indicates that the user identification information of the second user does not match the user identification information of the first user, causing the display of the image processing apparatus to display the initial screen to the second user, after the second user is authenticated.

* * * * *